United States Patent
Kumamoto et al.

(10) Patent No.: US 7,502,816 B2
(45) Date of Patent: Mar. 10, 2009

(54) SIGNAL-PROCESSING APPARATUS AND METHOD

(75) Inventors: Yoshinori Kumamoto, Kasuya-Gun (JP); Kazutaka Abe, Kadoma (JP)

(73) Assignee: Panasonic Corporation, Osaka (JP)

( * ) Notice: Subject to any disclaimer, the term of this patent is extended or adjusted under 35 U.S.C. 154(b) by 935 days.

(21) Appl. No.: 10/901,108

(22) Filed: Jul. 29, 2004

(65) Prior Publication Data
US 2006/0031276 A1 Feb. 9, 2006

(30) Foreign Application Priority Data
Jul. 31, 2003 (JP) ............................. 2003-284058

(51) Int. Cl.
*G06F 15/00* (2006.01)

(52) U.S. Cl. ...................................... 708/405
(58) Field of Classification Search ................. 708/405
See application file for complete search history.

(56) References Cited

U.S. PATENT DOCUMENTS

| | | | |
|---|---|---|---|
| 3,679,882 A | 7/1972 | McAuliffe | |
| 4,992,967 A | 2/1991 | Auvray | |
| 5,768,165 A | 6/1998 | Palicot et al. | |
| 6,704,438 B1 * | 3/2004 | Alexandru | 382/128 |
| 2002/0149513 A1 * | 10/2002 | Chaput et al. | 342/125 |

FOREIGN PATENT DOCUMENTS

| | | |
|---|---|---|
| JP | 8-501667 | 2/1996 |
| JP | 2000-267682 | 9/2000 |
| WO | 94/01933 | 1/1994 |

OTHER PUBLICATIONS

Masahiko Sagawa et al., "Fast Fourier Transform and Its Applications", published by Shoukoudou along with partial English translation, Apr. 20, 1996.
Henri J. Nussbaumer, "Fast Fourier Transform and Convolution Algorithms", published by Kagaku-Gijutu Shuppann-sha along with English Translation, 1989.

* cited by examiner

*Primary Examiner*—Tan V Mai
(74) *Attorney, Agent, or Firm*—Wenderoth, Lind & Ponack, L.L.P.

(57) ABSTRACT

First and second coefficients are fed into a Fast Fourier Transform unit through real number input and imaginary number input portions thereof, respectively, to perform the Fast Fourier Transform of the entered first and second coefficients, thereby producing a frequency-domain coefficient vector. The Fast Fourier Transform of an input signal is performed to transform the input signal into a frequency-domain signal vector. Thereafter, the transformed signal vector is multiplied by the coefficient vector for each element, thereby providing a multiplication result. The Inverse Fast Fourier Transform of the multiplication result renders real number output and imaginary number output portions of the inverse transformation result as first and second series of output signals, respectively.

8 Claims, 22 Drawing Sheets

SIGNAL-PROCESSING APPARATUS AND METHOD

BACKGROUND OF THE INVENTION

1. Field of the Invention

The present invention relates to a signal-processing apparatus and method usable as an either single-input, multiple-output or multiple-input, multiple-output digital filter.

2. Description of the Related Art

An either single-input, multiple-output or multiple-input, multiple-output digital filter is in widespread use in various service applications. The digital filter of this type is employed in, e.g., one system designed to locate sound at any position, and another system operable to add reflected sound to original sound to provide a feeling of soundscape.

The digital filter is classed as an IIR filter including a feedback portion and a FIR filter free thereof. The present description discusses the FIR filter.

FIG. 19(a) is a block diagram illustrating details of a prior art single-input, two-output time domain-designed FIR filter.

In FIG. 19(a), input signal "x" enters a FIR filter 5 through an input terminal 1. In the FIR filter 5, each delay device 8 delays input signal "x", and the delayed input signal "x" becomes a delay signal. A multiplier 7 multiplies each of the delay signals by a predetermined coefficient. The multiplied delay signals are fed into an adder 9. The adder 9 adds the inputs together, thereby delivering the addition result as output signal "y1" to an output terminal 2.

Similarly, as illustrated in FIG. 19(b), input signal "x" enters a FIR filter 6 through the input terminal 1, and output signal "y2" leaves the FIR filter 6 through an output terminal 3.

FIG. 19(b) schematically illustrates the FIR filters 5, 6. When illustrated similarly to FIG. 19(b), a two-input, two-output system and a six-input, four-output system are configured as illustrated in FIG. 19(c) and FIG. 20, respectively. In FIG. 19(c), the adders 9 are additionally provided to the two-input, two-output system.

The FIR filters of FIG. 19 and FIG. 20 perform time-domain processing. As evidenced by FIG. 20, according to the time-domain processing, an increase in degree (the number of taps) of the FIR filters brings about a very complicated circuit structure.

It is known that frequency-domain processing instead of the time-domain processing provides a reduced number of times of calculation (multiplication, addition, and subtraction) per unit time. This is because a time domain convolution is comparable, in a frequency domain, to a simple product of corresponding elements between vectors.

The following discusses the frequency-domain processing. A time-domain signal is initially transformed into a frequency-domain signal for each predetermined time window using Discrete Fourier Transform. Fast Fourier Transform (FFT), a high-speed calculation method of the Discrete Fourier Transform, is often used to perform the Discrete Fourier Transform a reduced number of times of calculation. Subsequently, a product of corresponding elements between the transformed signal vector and a coefficient vector (frequency domain) is calculated.

Thereafter, the Inverse Fast Fourier Transform of the calculated product is performed to return the frequency-domain result to a time-domain result. This processing is suited for calculation to be made by a high-order FIR filter.

Details of the frequency domain-designed FIR filter are taught in non-patent reference No. 1 ("Fast Fourier Transform and its Applications", chapter 5, written by Sagawa Masahiko and Kiya Hitoshi, Japan), and non-patent reference No. 2 ("Fast Fourier Transform and Convolution Algorithm", chapters 3 to 4, written by Henri J. Nussbaumer, 1982).

As pointed out by the above non-patent references No. 1 and No. 2, the frequency-domain convolution is usually a circular convolution, and there is a need for a countermeasure to bring the circular convolution to a linear convolution that is similar to a time-domain convolution.

Non-patent references No. 1 and No. 2 introduce an overlap-save method and an overlap-add method by way of specific methods for the above.

The following discusses an exemplary overlap-save method with reference to FIG. 21, in which coefficient "h" is convoluted into a series of input signals "x" to determine a series of output signals "y". In FIG. 21, "Re", "Im", and "Co" denote a real number, an imaginary number, and a complex number, respectively. These symbols are also used in the other drawings.

Assume that the present time window "Wn" has window length "N" (samples) and coefficient length "L" (samples). In this instance, a data renewal length is identified as "M", and a relationship between "M", "N", and "L" is established as follows:

$$M = N - L$$

Time windows "Wn−1" and "Wn+1" are the immediately previous and next time windows, respectively. Time windows "Wn−1", "Wn", and "Wn+1" are equal in window length to each other, and are set to be overlapped with each other by the distance of coefficient length "L" (samples).

Each component in the present time window "Wn" of a series of input signals "x" is fed into a FFT unit 11 through a real number input portion "11a" thereof. An imaginary number input portion "11b" of the FFT unit 11 is unused, but data containing only "zero" (N-numbers of samples) is placed into the FFT unit 11 through the imaginary number input portion "11b". This means that the components enter a single-system.

For coefficient "h", a coefficient having length "L" is placed forward to add zero having length "M" to the rear of the coefficient having length "L", thereby providing a time-domain real number coefficient having length "N". A series of real numbers of coefficient "h" is fed into a FFT unit 10 through a real number input portion "10a" thereof. An imaginary number input portion "10b" of the FFT portion 10 is unused, but data containing only "zero" (N-numbers of samples) enters the FFT unit 10 through the imaginary number input portion "10b". This means that the coefficients enter a single-system.

When the FFT unit 10 performs the window length "N"-based FFT of the real number coefficient as discussed above, then a coefficient vector "H" (a complex number, frequency domain) having length "N" is fed out of the FFT unit 10 through a complex output portion "10c" thereof.

Subsequently, in the series of input signals "x", L-numbers of samples are taken out of the immediately previous time window "Wn−1" from the tail end of data used in the immediately previous time window "Wn−1", while M-numbers of sample are taken out of the present time window "Wn" from the tail end of data in the present time window "Wn". As a result, a series of real number signals having length "N" is provided. The series of real number signals having length "N" is fed into the FFT unit 11 through the real number input portion "11a". When the FFT unit 11 performs the FFT of the series of real number signals having length. "N", then data vector "X" (a complex number, frequency domain) having length "N" is emitted from the FFT unit 11 through a complex output portion "11c" thereof.

Thereafter, a complex-multiplying unit 12 performs the complex multiplication of coefficient vector "H" and data vector "X" for each element.

Assume that coefficient vector "H" and data vector "X" are "H=[H(1), H(2) to H(N)]" and "X=[X(1), X(2) to X(N)]", respectively. The complex-multiplying unit 12 calculates in such a manner that a complex multiplication result is Y=H·X= [H(1)X(1), H(2)X(2) to H(N)X(N)]. Such calculation result "Y" is fed into an IFFT unit 13 through a complex input portion "13c" thereof.

The IFFT unit 13 performs the window length "N"-based Inverse Fast Fourier Transform (IFFT) of calculation result "Y", thereby returning the frequency-domain calculation result "Y" to time-domain calculation result "Y". As a result, a series of output signals "y" is fed out of the IFFT unit 13 through a real number output portion "13a" thereof. An imaginary number output portion "13b" of the IFFT unit 13 is unused.

L-numbers of samples (marked by "X" in FIG. 21) in the determined a series of output signals "y" at the head thereof are discarded because the L-numbers of samples are influenced by a circular convolution. As a result, signal data in the remaining M-numbers of samples is rendered as wanted series of output signals "y".

The following discusses the overlap-add method with reference to FIG. 22. The overlap-add method provides substantially the same results as those from the overlap-save method. For example, to provide a series of real numbers "y" by convoluting coefficient "h" into a series of real numbers "x", the same determination as above is made as to FFT window length "N" (samples), coefficient length "L" (samples), and data renewal length "M" (samples), and coefficient vector "H" having length "N".

However, according to the overlap-add method, L-numbers of samples have data of "zero" from the tail end of input data in the present time window "Wn". In addition, according to the overlap-add method, L-numbers of samples at the head of signal data provided by the IFFT unit 13 are added to L-numbers of samples from the tail end of obtained signal data in the immediately previous time window "Wn−1".

In this way, M-numbers of samples are provided. Signal data in M-numbers of samples from the head of the series of output signals "y" is identified as wanted series of output signals "y". At this time, the IFFT unit 13 takes L-numbers of samples out of time window "Wn"-related series of output signals "y" from the tail end of the same series of output signals "y", and places the L-numbers of samples into a memory 14 for the purpose of addition in the next convolution.

The following assesses the number of times of calculation according to the overlap-save and -add methods. The assessments focus on the number of times of calculation for each of M(=N−L)-numbers of samples.

According to the overlap-save method,
FFT complex multiplication (N/2) Log2 (N−1);
Complex addition N Log2 (N);
Vector multiplication complex multiplication N;
IFFT complex multiplication (N/2) Log2 (N−1); and
Complex addition N Log2 (N).
The total number of times of calculation is:
Complex multiplication N Log2 (N−1)+N; and
Complex addition 2N Log2 (N),
where Log2 (N) denotes a logarithm of N to the base 2.

The overlap-add method provides a substantially similar number of times of calculation.

The FFT of coefficients is executed only once during activation, and can be separated from real time system processing relating to a series of input signals. Accordingly, the above-determined number of times of calculation excludes a coefficient FFT-related number of times of calculation.

Several methods based on the above-described processes have been proposed for achieving a reduced memory volume and a reduced number of times of calculation per unit time using properties of complex FFT.

Patent reference No. 1 (published U.S. Pat. No. 3,679,882) discloses a method for attaining the above purposes by executing each of the complex FFT and feedback once instead of performing each of the FFT and IFFT once.

Non-patent references No. 1 and No. 2 disclose another method (hereinafter called a "prior art improved method"). The following discusses the prior art improved method with reference to FIG. 23.

As illustrated in FIG. 23, according to the prior art improved method, the present time window "Wn" and the next time window "Wn+1" in a series of input signals "x" are used at a time. The time windows "Wn−1", "Wn", and "Wn+1" stand in the same relationship as above.

Data in time window "Wn" and that in time window "Wn+1" are fed into the FFT unit 11 through the real number input portion "11a" and the imaginary number input portion "11b", respectively.

The FFT unit 11 performs the complex FFT of the entered data, thereby feeding complex number data vector "X" out of the FFT unit 11 through the complex output portion "11c" into the complex-multiplying unit 12.

Coefficient vector "H" is provided similarly to the previous discussion.

However, when the IFFT unit 13 performs the IFFT of calculation result "Y", then time window "Wn"-related series of output signals "y" and time window "Wn+1"-related series of output signals "y" are fed out of the IFFT unit 13 through the real number output portion "13a" and the imaginary number output portion "13b", respectively.

According to the prior art improved method, 2M-numbers of samples, twice as large as M-numbers of samples, can advantageously be processed the same number of times of calculation as that according to the overlap-save method of FIG. 21.

The methods as described above seek to provide an efficient single-input, single-output FIR filter.

To apply such efficiency to a single-input, multiple-output FIR filter and a multiple-input, multiple-output FIR filter, single-input, single-output FIR filters are arranged in parallel with each other in a manner similar to that in which the time domain-designed FIR filters are arrayed.

FIG. 24(a) and FIG. 24(b) illustrate a prior art single-input, two-output signal-processing apparatus and a prior art two-input, two-output signal-processing apparatus, respectively.

In the signal-processing apparatus of FIG. 24(a), the time domain-designed FIR filter of FIG. 19(b) is replaced by a frequency domain-designed FIR filter. In the signal-processing apparatus of FIG. 24(b), the time domain-designed FIR filters of FIG. 19(c) are replaced by frequency domain-designed FIR filters.

The signal-processing apparatus of FIG. 24(a) includes a FFT unit 15, IFFT units 16, 17, and complex-multiplying units 18, 19. The signal-processing apparatus of FIG. 24(b) includes a FFT unit 20, complex-multiplying units 21, 22, and adders 23, 24 in addition to components as illustrated in FIG. 24(a).

The following evaluates the number of times of calculation according to the prior art improved method.

According to the usual overlap-save method, a single-input, two-output frequency domain-designed filter provides the number of times of calculation as given below for each of M(=N−L)-numbers of samples:
FFT complex multiplication (N/2) Log2 (N−1);
Complex addition N Log2 (N);
Vector multiplication complex multiplication 2N;
IFFT complex multiplication N Log2 (N−1); and
Complex addition 2N Log2 (N).
The total number of times of calculation is:
Complex multiplication (3N/2) Log2 (N−1)+2N; and
Complex addition 3N Log2 (N).

In further accordance with the usual overlap-save method, a two-input, two-output frequency domain-designed filter provides the number of times of calculation as given below for each of M(=N−L)-numbers of samples.
FFT complex multiplication Log2 (N−1);
Complex addition 2N Log2 (N);
Vector multiplication complex multiplication 4N;
Vector addition complex addition 2N;
IFFT complex multiplication N Log2 (N−1); and
Complex addition 2 N Log2 (N).
The total number of times of calculation is:
Complex multiplication 2N Log2 (N−1)+4N; and
Complex addition 4N Log2 (N)+2N.

The use of the prior art improved method as illustrated in FIG. 23 makes it feasible to calculate 2M-numbers of samples the same number of times of calculation as above.

However, as evidenced by FIG. 23, the prior art improved method cannot start calculation until data from both of time windows "Wn" and "Wn+1" are ready for use. Accordingly, a problem with the prior art improved method is that a delay time until the data get ready for use is nearly twice as long as that according to the overlap-save method of FIG. 21 and that according to the overlap-add method of FIG. 22.

OBJECT AND SUMMARY OF THE INVENTION

In single-input, multiple-output and multiple-input, multiple-output FIR filters, there have been demands for a further reduced number of times of calculation per unit time and for a further reduced amount of delay in processing. However, no account has been taken of optimization in light of single-input, multiple-output and multiple-input, multiple-output. Accordingly, the FIR filters must be operated with still higher efficiency.

In view of the above, an object of the present invention is to provide a signal-processing apparatus operable with improved efficiency in single-input, multiple-output or multiple-input, multiple-output in terms of the number of times of calculation per unit time and an amount of delay in processing.

The above, and other objects, features and advantages of the present invention will become apparent from the following description read in conjunction with the accompanying drawings, in which like reference numerals designate the same elements.

DETAILED DESCRIPTION OF THE PREFERRED EMBODIMENTS

Embodiments of the present invention are now described with reference to the accompanying drawings.

First Embodiment

Figure 1:
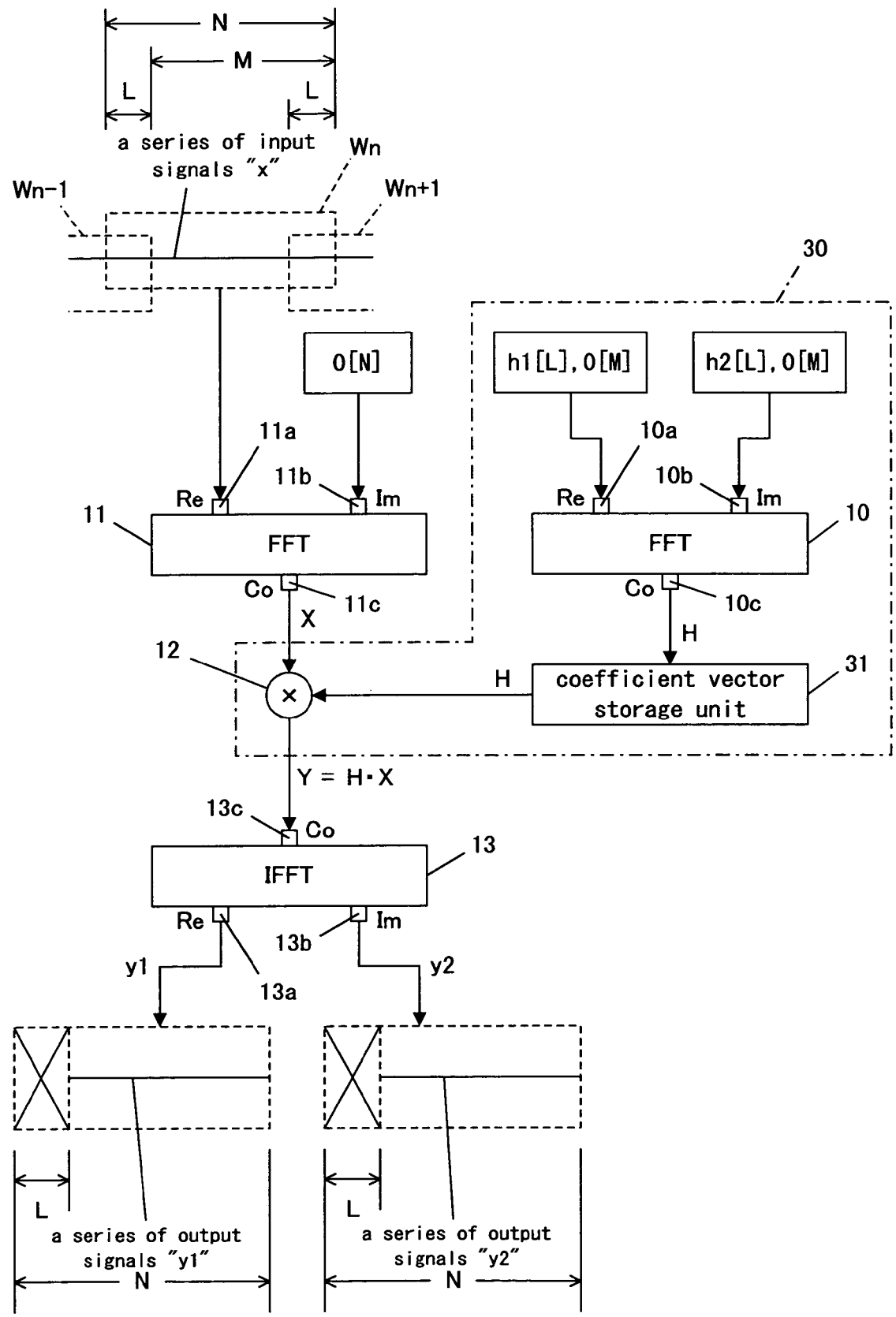
FIG. 1 is a block diagram illustrating a signal-processing apparatus according to a first embodiment of the present invention.
Figure 2:
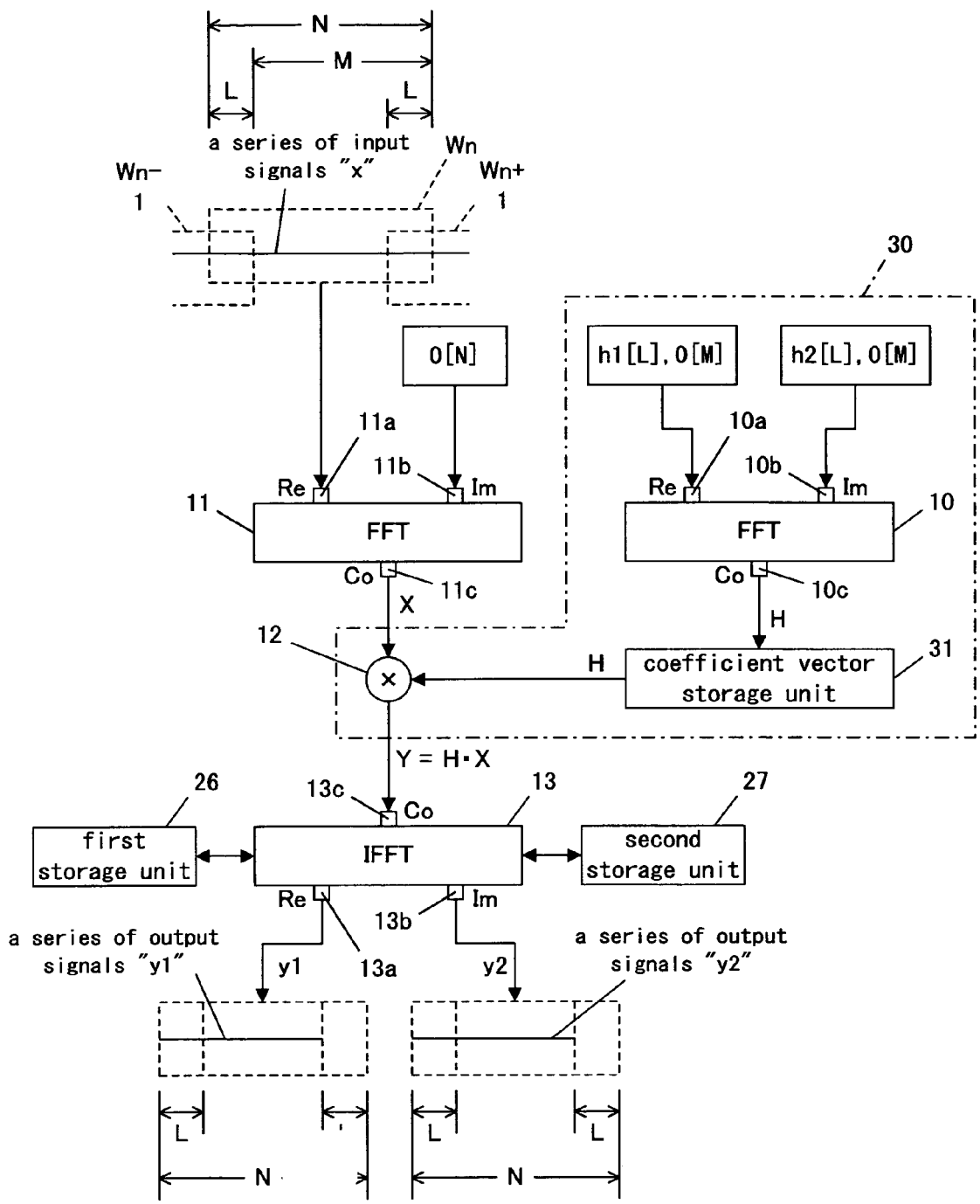
FIG. 2 is a block diagram illustrating a signal-processing apparatus according to the first embodiment.

FIG. 1 is a block diagram illustrating a signal-processing apparatus according to a first embodiment of the present invention, in which an overlap-save method is employed. FIG. 2 is a block diagram illustrating a signal-processing apparatus according to the present embodiment, in which an overlap-add method is used. The present embodiment is concerned with a single-input, two-output signal-processing system.

Figure 21:
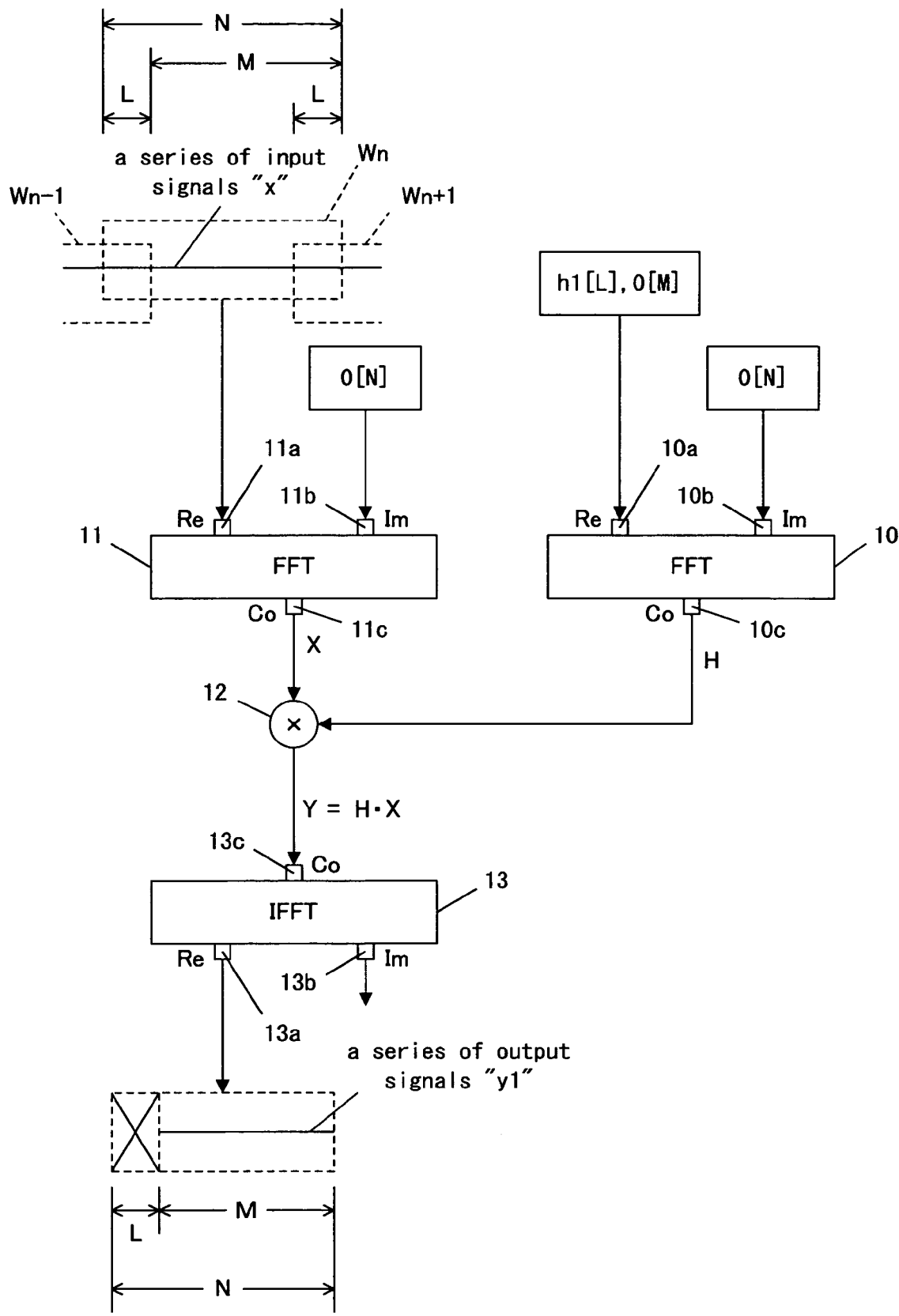
FIG. 21 is a block diagram illustrating a prior art signal-processing apparatus.
Figure 22:
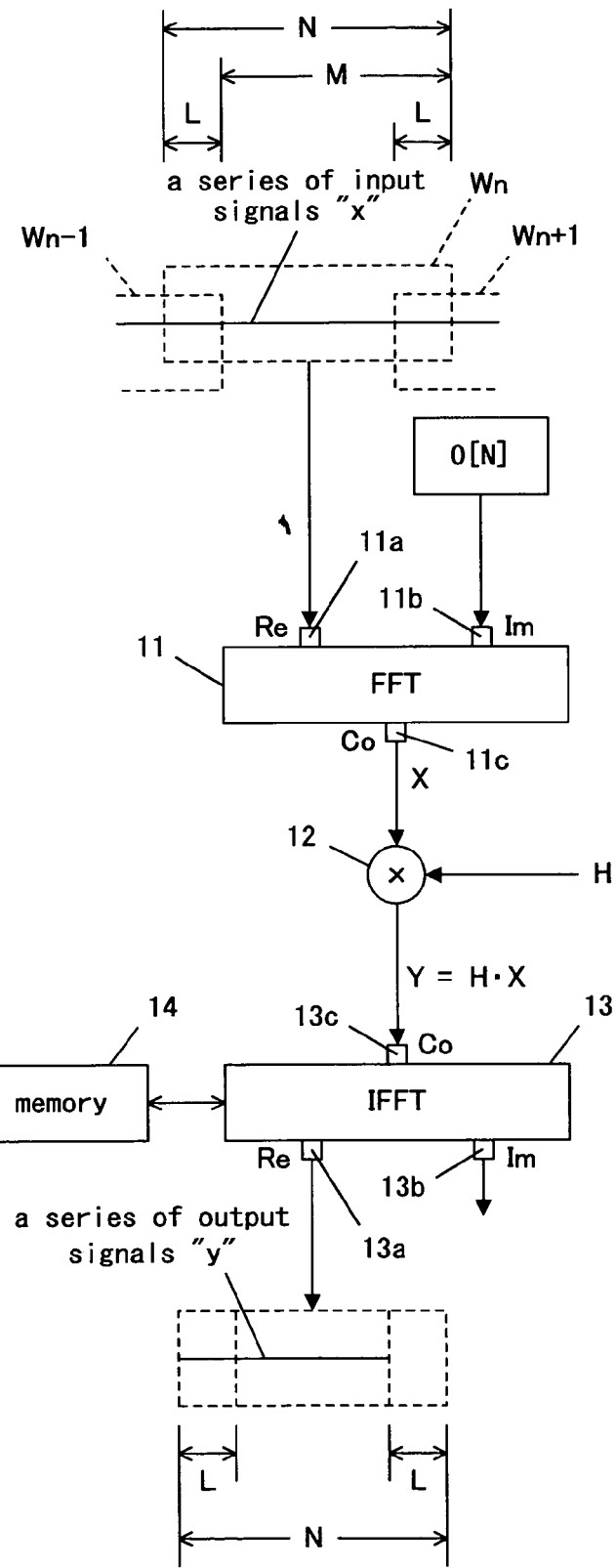
FIG. 22 is a block diagram illustrating a prior art signal-processing apparatus.
Figure 23:
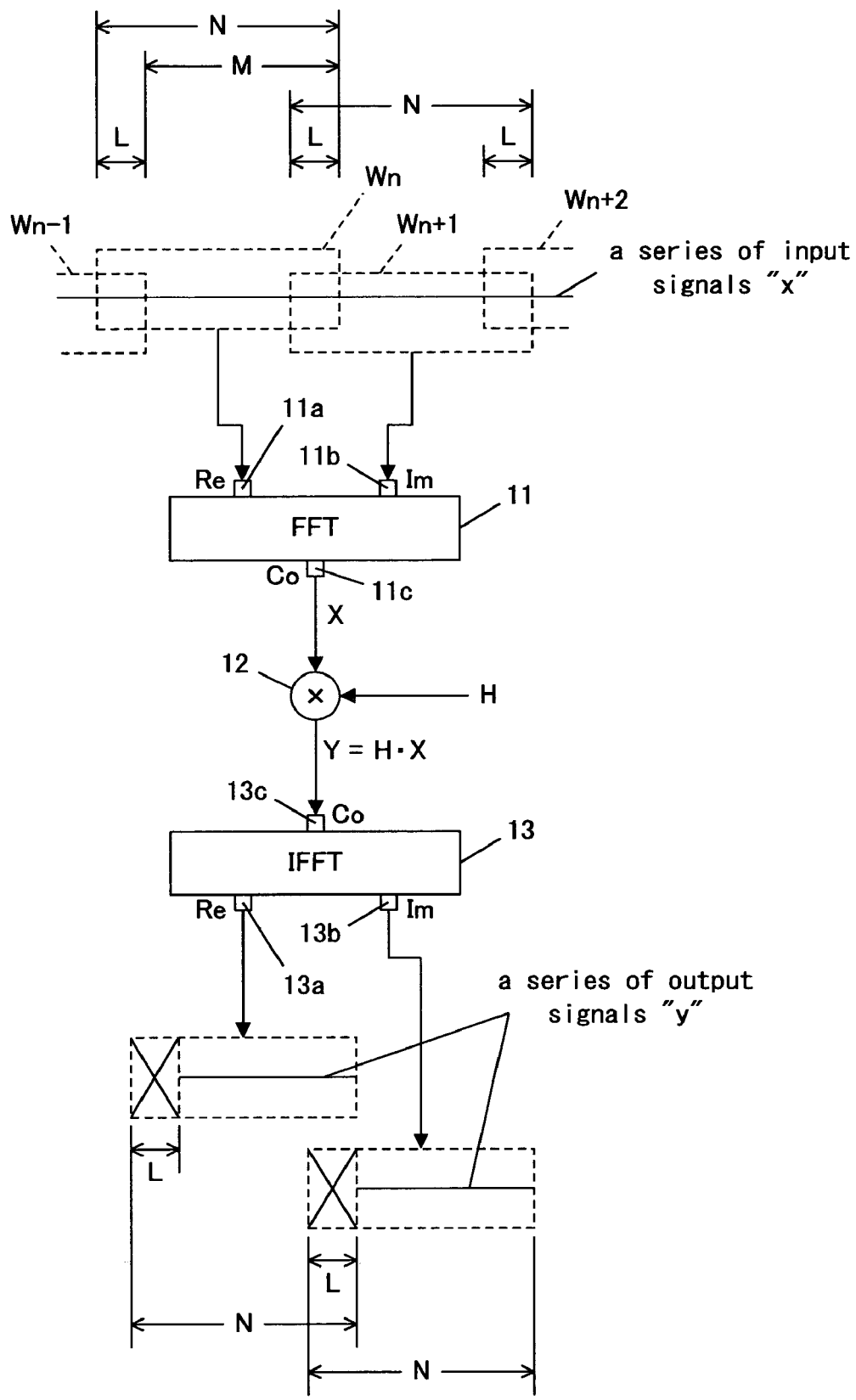
FIG. 23 is a block diagram illustrating a prior art signal-processing apparatus.
Figure 24A:
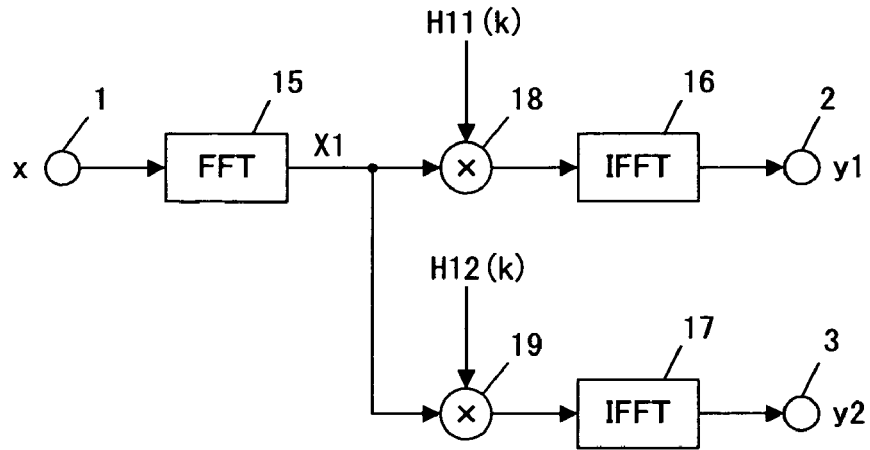
FIG. 24(a) is a block diagram illustrating a prior art signal-processing apparatus.
Figure 24B:
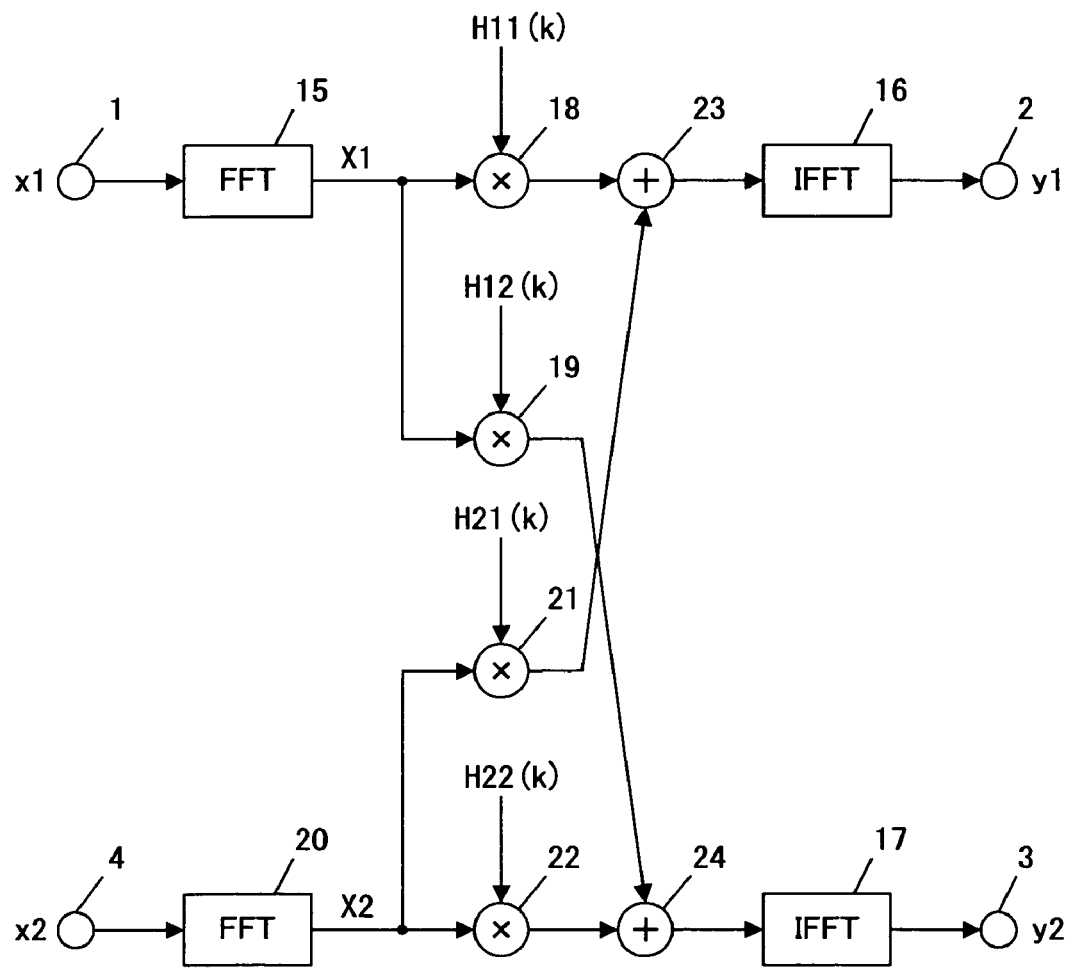
FIG. 24(b) is a block diagram illustrating a prior art signal-processing apparatus.

Exemplary use of the overlap-save method is now described with reference to FIG. 1. The following discussion assumes that coefficient "h" is convoluted into a series of input signals "x" to determine a series of output signals "y". Time windows are set similarly to FIG. 21.

More specifically, assume that the present time window "Wn" has window length "N" (samples) and coefficient length "L" (samples). When it is assumed that a data renewal length is "M" (samples), then "N", "L", and "M" stand in the following relationship: M=N−L Time windows "Wn−1" and "Wn+1" are the immediately previous time window and the next time window, respectively. Time windows "Wn−1", "Wn", and "Wn+1" are equal in window length to each other, and are set to be overlapped with each other by the distance of coefficient length "L" (samples).

An FFT unit 11 (the first FFT unit) is operable to transform each component in time window "Wn" of a series of real numbers, thereby feeding complex number data vector "X" out of the FFT unit 11 through a complex output portion "lic" thereof. The FFT unit 11 includes a real number input portion "11a" and an imaginary number input portion "11b". The components in time window "Wn" of a series of input signals "x" are fed into the FFT unit 11 only through the real number input portion "11a".

The imaginary number input portion "11b" is unused, but data containing only "zero" (N-numbers of samples) are fed into the FFT unit 11 through the imaginary number input portion "11b". This means that the series of input signals enters a single system.

A vector-multiplying unit 30 according to the present embodiment is operable to perform the complex multiplication of complex number data "X" and coefficient vector "H" for each element, thereby yielding calculation result "Y".

The vector-multiplying unit 30 includes a FFT unit 10 (the second FFT unit) and a coefficient vector storage unit 31 operable to store coefficient vector "H".

The FFT unit 10 includes a real number input portion "10a", an imaginary number input portion "10b", and a complex output portion "10c". First coefficient "h1" having length "L" is put forward to add zero having length "M" to the rear of first coefficient "h1", thereby providing a time-domain coefficient having length "N". Similarly, second coefficient "h2" having length "L" is placed forward to add zero having length "M" to the rear of second coefficient "h2", thereby providing a time-domain coefficient having length "N".

First coefficient "h1"- and second coefficient "h2"-related components are fed into the FFT unit 10 through the real number input portion "10a" and the imaginary number input portion "10b", respectively. This means that the coefficients enter two different systems, which differ from the single system of FIG. 21.

The FFT unit 10 performs the complex FFT of the first and second coefficient "h1"- and "h2"-related components, thereby feeding coefficient vector "H" (a complex number, a frequency domain) having length "N" out of the FFT unit 10 through the complex output portion "10c".

The coefficient vector storage unit 31 stores the outputted coefficient vector "H".

The calculation of coefficient vector "H" and the storage of coefficient vector "H" in the coefficient vector storage unit 31 are preferably practiced before the input of a series of input signals "x". This is because coefficient vector "H" is merely required to be read out from the coefficient vector storage unit 31, thereby realizing high-speed processing.

The vector-multiplying unit 30 further includes a complex-multiplying unit 12 operable to practice the complex multiplication of coefficient vector "H" and data vector "X" for each component.

More specifically, when it is assumed that coefficient vector "H" and data vector "X" are H=[H(0), H(1) to H(N−1)] and X=[X(0), X(1) to X(N−1)], respectively, then the complex-multiplying unit 12 calculates in such a manner that a result from the complex multiplication is: Y=H·Y=[H(0) X(0), H(1) X(1) to H(N−1) X(N−1)]

The calculation result "Y" is fed into an IFFT unit 13 through a complex input portion "13c" thereof.

The IFFT unit 13 is operable to perform window length "N"-based Inverse Fast Fourier Transform of calculation result "Y" from the vector-multiplying unit 30, thereby returning the frequency-domain calculation result "Y" to a time-domain calculation result.

As a result, a series of output signals "y1" is fed out of the IFFT unit 13 through a real number output portion "13a" thereof. The series of output signals "y1" is a series of input signals "x" having first coefficient "h1" acting thereon.

In addition, a series of output signals "y2" is fed out of the IFFT unit 13 through an imaginary number output portion "13b" thereof. The series of output signals "y2" is a series of input signals "x" having second coefficient "h2" acting thereon.

In FIG. 1, the outputs from the IFFT unit 13 are utilized in accordance with the overlap-save method. Accordingly, L-numbers of samples (marked by "X") in a series of output signals "y1" at the head thereof are discarded because the L-numbers of samples marked by "X" therein are influenced by a circular convolution. As a result, signal data in the remaining M-numbers of sample in a series of output signals "y1" is rendered as wanted series of output signals "y1".

Similarly, L-numbers of samples (marked by "X") in a series of output signals "y2" at the head thereof are discarded because the L-numbers of samples marked by "X" therein are influenced by the circular convolution. As a result, signal data in the remaining M-numbers of samples in a series of output signals "y2" is rendered as wanted series of output signals "y2".

The following discusses, with reference to FIG. 2, exemplary use of the outputs from the inverse FFT unit 13 in accordance with the overlap-add method. As evidenced by a comparison between FIG. 1 and FIG. 2, both of the signal-processing apparatuses are substantially similar in construction to one another except for the IFFT unit 13.

However, as illustrated in FIG. 2, according to the overlap-add method, L-numbers of samples have data of "zero" from the tail end of input data in the present time window "Wn", as described herein in the section of "The Background of the Related Art". In addition, L-numbers of samples from the tail end of time window "Wn"-related series of output signals must be stored for the purpose of addition in the next convolution.

As described with reference to FIG. 1, the IFFT unit 13 provides two different outputs, i.e., two series of output signals "y1" and "y2". Accordingly, the signal-processing apparatus according to the present embodiment includes first and second storage units 26, 27. The first storage unit 26 is operable to store L-numbers of samples from the tail end of time window "Wn"-related series of output signals "y1". The second storage unit 27 is operable to store L-numbers of samples from the tail end of the time window "Wn"-related series of output signals "y2".

The following evaluates the number of times of calculation in FIGS. 1 and 2. However, the evaluations exclude the number of times of calculation of coefficient vector "H" from the number of times of calculation per unit time because, according to the present embodiment, the coefficient vector storage unit 31 stores results from the calculation of coefficient vector "H" before a series of input signals "x" is processed.

According to the present embodiment, two convolutions are executed when the FFT, vector multiplication, and IFFT are each practiced once. The number of times of calculation per unit time for each of M(=N−L)-numbers of samples is:
FFT complex multiplication (N/2) Log2 (N−1);
Complex addition N Log2 (N);
Vector multiplication complex multiplication N;
Vector addition complex addition-free;
IFFT complex multiplication (N/2) Log2 (N−1); and
Complex addition N Log2 (N).
The total number of times of calculation is:
Complex multiplication N Log2 (N−1)+N; and
Complex addition 2N Log2 (N).
The prior art total number of times of calculation is:
Complex multiplication (3N/2) Log2 (N−1)+2N; and
Complex addition 3N Log2 (N).

As a result, the calculation according to the present embodiment is one and half times as fast as that according to the prior art.

The above result might seem at first glance that the prior art improved method provides a fewer number of times of calculation than the present embodiment does. However, according to the prior art improved method, data is renewed for each of 2M-numbers of samples, and a buffer saving-caused delay time until FFT input data get ready is twice as long as that in the circuit of FIG. 1. This means that a correct comparison must be made in accordance with assessments based on the same renewal time (the buffer saving-caused delay time) and the same number of filter taps.

More specifically, according to the prior art improved method, new "N" as given below must be a FFT window length: N=(M/2+L)

Therefore, according to the prior art improved method, the number of times of calculation for each of M-numbers of samples is:
Complex multiplication 0.75 (M+2L) Log2 (M/2+L−1)+(M+2L); and
Complex addition 3 (M/2+L) Log2 (M/2+L).

Meanwhile, in the signal-processing apparatus according to the present embodiment, "N" bears the following relationship: N=M+L Therefore, according to the present embodiment, the number of times of calculation for each of M-numbers of samples is:
Complex multiplication (M+L) Log2 (M+L−1)+(M+L); and
Complex addition 2 (M+L) Log2 (M+L).

To compare the above two different results with one another, 2048 and 4096 are substituted for "M" and "L", respectively, in accordance with the following typical values: M=2048, L=4096

As a result, according to the prior art improved method, the total number of times of calculation is:
Complex multiplication 104870; and
Complex addition 189260.

According to the present embodiment, the total number of times of calculation is:
Complex multiplication 83465; and
Complex addition 154641.

As seen from the above, the number of times of calculation according to the present embodiment is reduced by some 20% per unit time, when compared with the prior art improved method.

The substitution of other practical numeric values similarly provides a reduced number of times of calculation according to the present embodiment when compared with the prior art improved method, although there are variations in reduction percentage.

As described above, one of time-domain coefficients and the other thereof are placed into the FFT unit through the real number portion and imaginary number portion thereof, respectively, to perform the FFT of the coefficients, thereby providing a series of frequency-domain coefficients. The use of the series of frequency-domain coefficients provides the beneficial effect of providing a reduced amount of calculation per unit time.

Second Embodiment

A signal-processing apparatus according to a second embodiment is now described with reference to FIG. 3 to FIG. 6. Different from the previous embodiment, the present embodiment is concerned with a two-input, two-output system.

Figure 3:
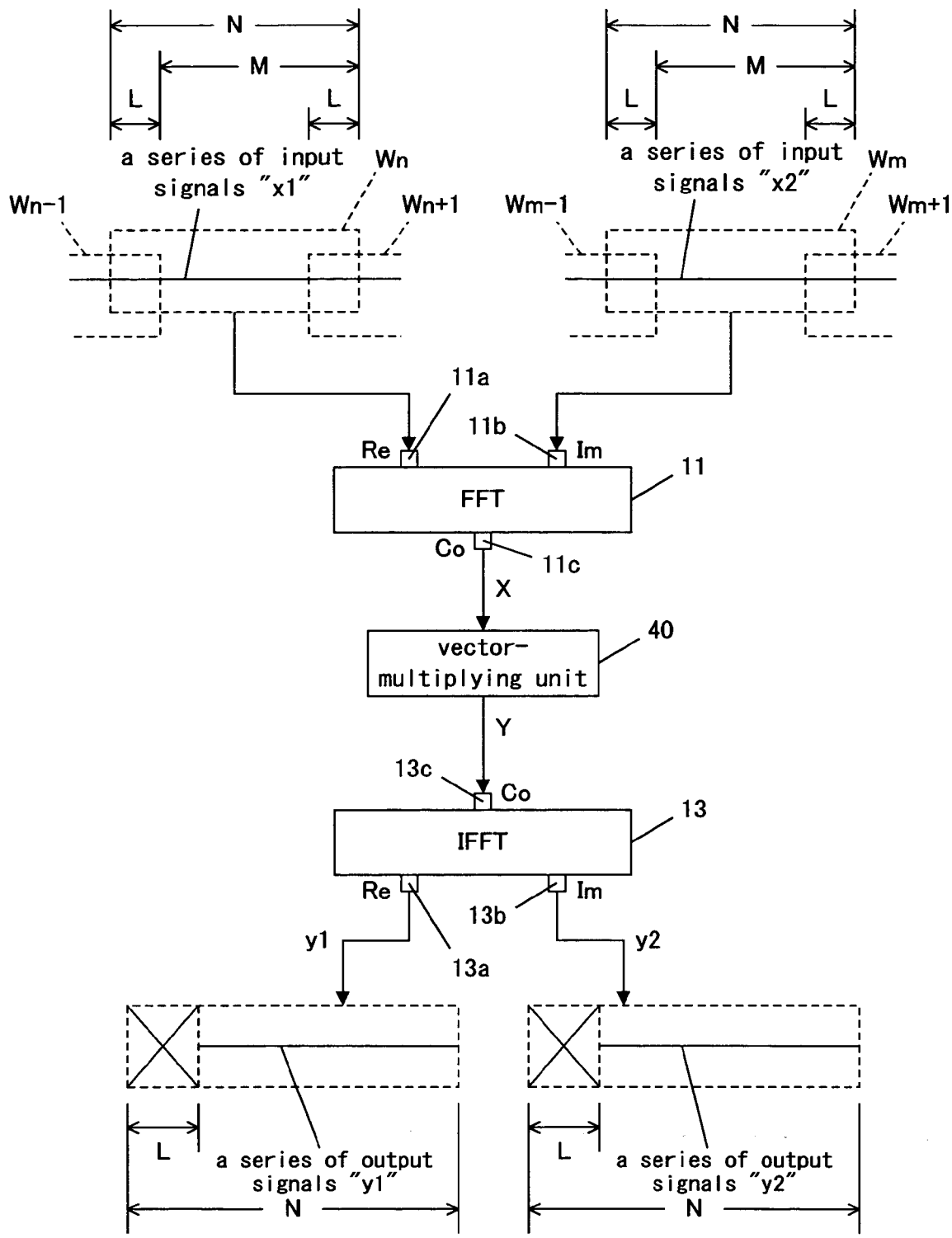
FIG. 3 is a block diagram illustrating a signal-processing apparatus according to a second embodiment.
Figure 4:
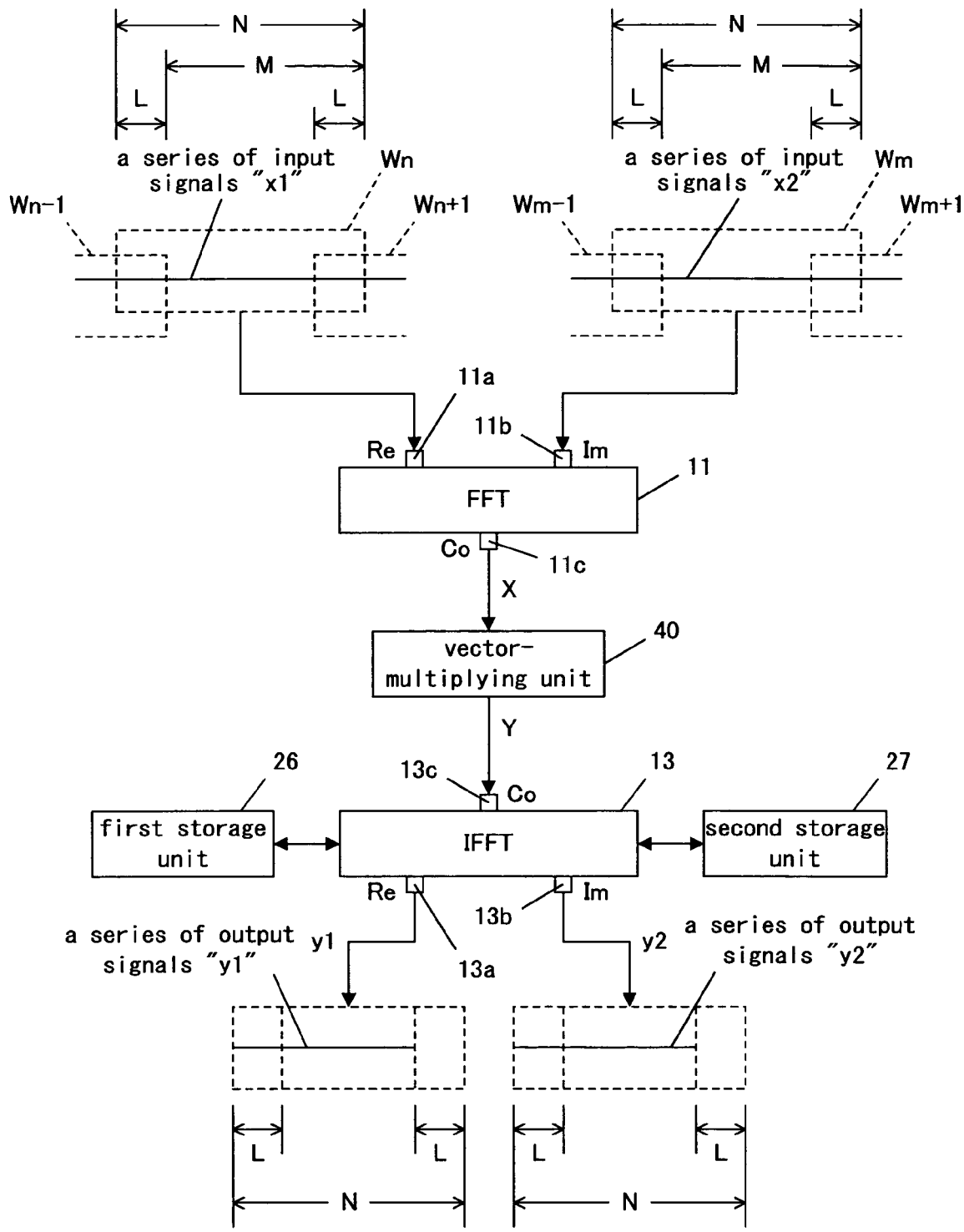
FIG. 4 is a block diagram illustrating a signal-processing apparatus according to the second embodiment.

FIG. 3 is a block diagram illustrating a signal-processing apparatus according to the present embodiment. FIG. 3 is comparable to FIG. 1, and illustrates an exemplary embodiment according to an overlap-save method. FIG. 4 is a block diagram illustrating a signal-processing apparatus according to the present embodiment. FIG. 4 is comparable to FIG. 2, and illustrates an exemplary embodiment according to an overlap-add method.

A FFT unit 11 (the first FFT unit) and an inverse FFT unit 13 are similar in construction to those according to the previous embodiment. As discussed above, however, the present embodiment is concerned with a multiple-input, multiple-output system, in which a series of input signals (the first series of input signals) "x1" (time window "Wn") is fed into the FFT unit 11 through a real number input portion "11a" thereof, while a series of input signals (the second series of input signals) "x2" (time window "Wm") is fed into the FFT unit 11 through an imaginary number input portion "11b" thereof. Time windows "Wn", "Wm" are equal in window length to one another, and are constructed similarly to the previous embodiment.

Pursuant to the present embodiment, two series of input signals "x1", "x2" can be a different series of real numbers. In addition, the present embodiment assumes that time windows "Wn" and "Wm" are equal in position to one another on a time axis.

A two-channel acoustic signal may typically have left channel (Lch)- and right channel (Rch)-components identified as a series of input signals "x1" and "x2", respectively.

The inverse FFT unit 13 feeds two series of output signals "y1", "y2" (time domains) outside through a real number output portion "13a" and imaginary number output portion "13b" thereof, respectively.

A vector-multiplying unit 40 is similar to the vector-multiplying unit 31 according to the previous embodiment in terms of that complex number data vector "X" and coefficient vector "H" are convoluted together to yield calculation result "Y", and that a coefficient vector storage unit is provided to store the coefficient vector "H".

However, components relating to a series of input signals "x1" and a series of input signals "x2" are combined into data vector "X" and fed into the vector-multiplying unit 40. Accordingly, as discussed below, the vector-multiplying unit 40 differs in construction from the vector-multiplying unit 31 according to the previous embodiment.

Figure 5:
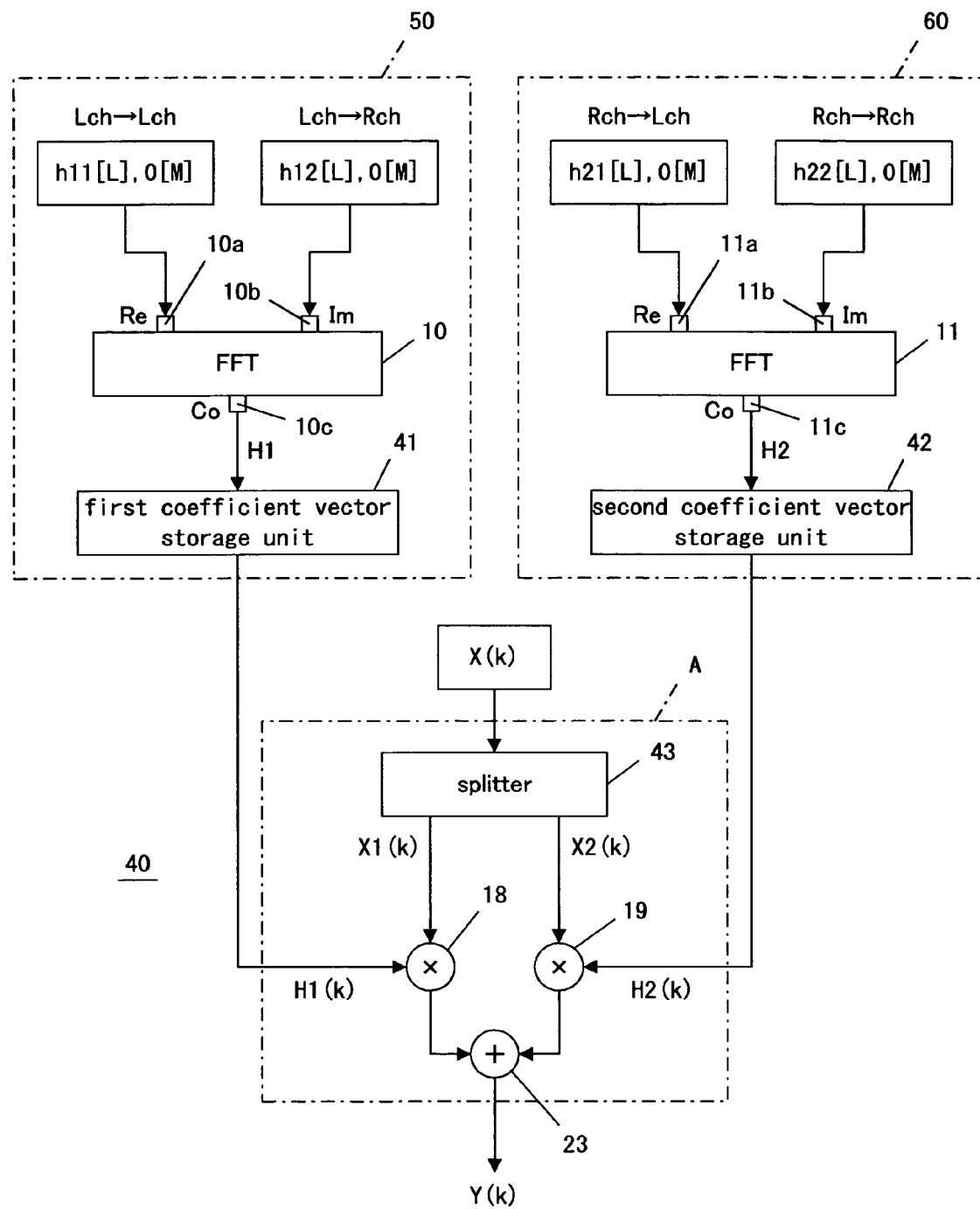
FIG. 5 is a block diagram illustrating a vector-multiplying unit according to the second embodiment.

FIG. 5 is a block diagram illustrating the vector-multiplying unit according to the present embodiment. The following discusses principles, under which the vector-multiplying unit 40 operates, before the construction of the vector-multiplying unit as illustrated in FIG. 5 is described. As illustrated in FIGS. 3 and 4, the vector-multiplying unit 40 is operable in accordance with both of the overlap-save and -add methods.

Assume that series of input signals "x1", "x2", series of output signals "y1", "y2", and coefficients "h11", "h12", "h21", and "h22" meet the following relationship:

$Y1 = h11 \cdot x1 + h21 \cdot x2$; and $Y2 = h12 \cdot x1 + h22 \cdot x2$.

For both of time windows "Wn", "Wm", when it is assumed that a window length is "N" (samples), a coefficient length is "L" (samples), and a data renewal length is "M" (samples), then "M", "N", and "L" stands in the relationship: M=N−L The above relationship is the same as that according to the previous embodiment.

However, as discussed above, data vector "X" combined with the components relating to the series of input signals "x1" and "x2" are fed into the vector-multiplying unit 40. Accordingly, the present embodiment provides a splitter operable to at first separate data vector "X" into the components relating to the series of input signals "x1" and the series of input signals "x2", thereby convoluting a corresponding coefficient vector into each of the separated components. Thereafter, calculation results are combined together to provide calculation result "Y". As a result, the vector-multiplying unit 40 provides calculation result "Y".

As illustrated in FIG. 5, the vector-multiplying unit 40 includes components as given below.

The splitter 43 is operable to separate complex number data vector "X(k)" into first and second components "X1(k)", "X2(k)". The first and second components "X1(k)", "X2(k)" are related to first and second series of input signals "x1", "x2", respectively.

First and second coefficient vector-supplying units 50 and 60 supply first and second coefficient vectors "H1(k)", "H2(k)", respectively.

A first complex-multiplying unit 18 performs the complex multiplication of first component "X1(k)" and first coefficient vector "H1(k)". A second complex-multiplying unit 19 performs the complex multiplication of second component "X2(k)" and second coefficient vector "H2(k)".

An adder 23 is operable to add a multiplication result from the first complex-multiplying unit 18 to that from the second complex-multiplying unit 19, thereby providing calculation result "Y(k)". As a result, the vector-multiplying unit 40 provides calculation result "Y(k)".

The first and second coefficient vector-supplying units 50, 60 are similar in construction to the vector-multiplying unit 30 of FIGS. 1 and 2, but without the complex-multiplying unit 12.

More specifically, the first coefficient vector-supplying unit 50 includes a FFT unit 10 and a first coefficient vector storage unit 41. A coefficient "h11"-related time domain series having length "N" is fed into the FFT unit 10 through a real number input portion "10a" thereof. A coefficient "h12"-related time domain series having length "N" is fed into the FFT unit 10 through an imaginary number input portion "10b" thereof. The complex FFT of coefficients "h11" and "h12" is performed to provide coefficient vector "H1". Coefficient vector "H1" is fed out of the FFT unit 10 through a complex output portion "10c" thereof. The first coefficient vector storage unit 41 stores coefficient vector "H1".

Similarly, the second coefficient vector-supplying unit 60 includes a FFT unit 11 and a second coefficient vector storage unit 42. A coefficient "h21"-related time domain series having length "N" is fed into the FFT unit 11 through a real number input portion "11a" thereof. A coefficient "h22"-related time domain series having length "N" is fed into the FFT unit 11 through an imaginary number input portion "11b" thereof. The complex FFT of coefficients "h21" and "h22" is executed to provide coefficient vector "H2". Coefficient vector "H2" is fed out of the FFT unit 11 through a complex output portion "11c" thereof. The second coefficient vector storage unit 42 stores the coefficient vector "H2".

It is preferable that a coefficient defining a coupling from "Lch" input to "Lch" output is selected as coefficient "h11", a coefficient defining a coupling from "Lch" input to "Rch" output is selected as coefficient "h12", a coefficient defining a coupling from "Rch" input to "Lch" output is selected as coefficient "h21", and a coefficient defining a coupling from "Rch" input to "Rch" output is selected as coefficient "h22".

The following discusses an exemplary construction of the splitter 43 with reference to FIG. 6. An initial description is made as to principles under which the splitter 43 operates.

The FFT of two series of real numbers "x1(n)", "x2(n)" is practiced independently to transform time domain data into frequency-domain complex number data "X1(k)", "X2(k)". In addition, a series of complex signals "x(n)" is defined as follows:

$x(n) = x1(n) + jx2(n)$ ("$j$" is hereinafter referred to as an imaginary number unit).

The FFT of the series of complex signals "x(n)" is practiced to provide complex number data "X(k)": $X(k) = X1(k) + jX2(k)$ At this time, the use of X(k) permits $X1(k)$, $X2(k)$ to be expressed as follows:

$$X1(k)=\{X(k)+X^*(N-k)\}/2;\text{ and}$$

$$X2(k)=\{X(k)-X^*(N-k)\}/2.$$

(Asterisk * herein denotes a complex conjugate.)

In other words, when the splitter 43 of FIG. 5 is constructed to meet the above relationship, then the splitter 43 is possible to separate complex number data vector "X(k)" into a component "$X1(k)$" relating to a series of input signals "x1" and a component "$X2(k)$" relating to a series of input signals "x2".

Figure 6A:
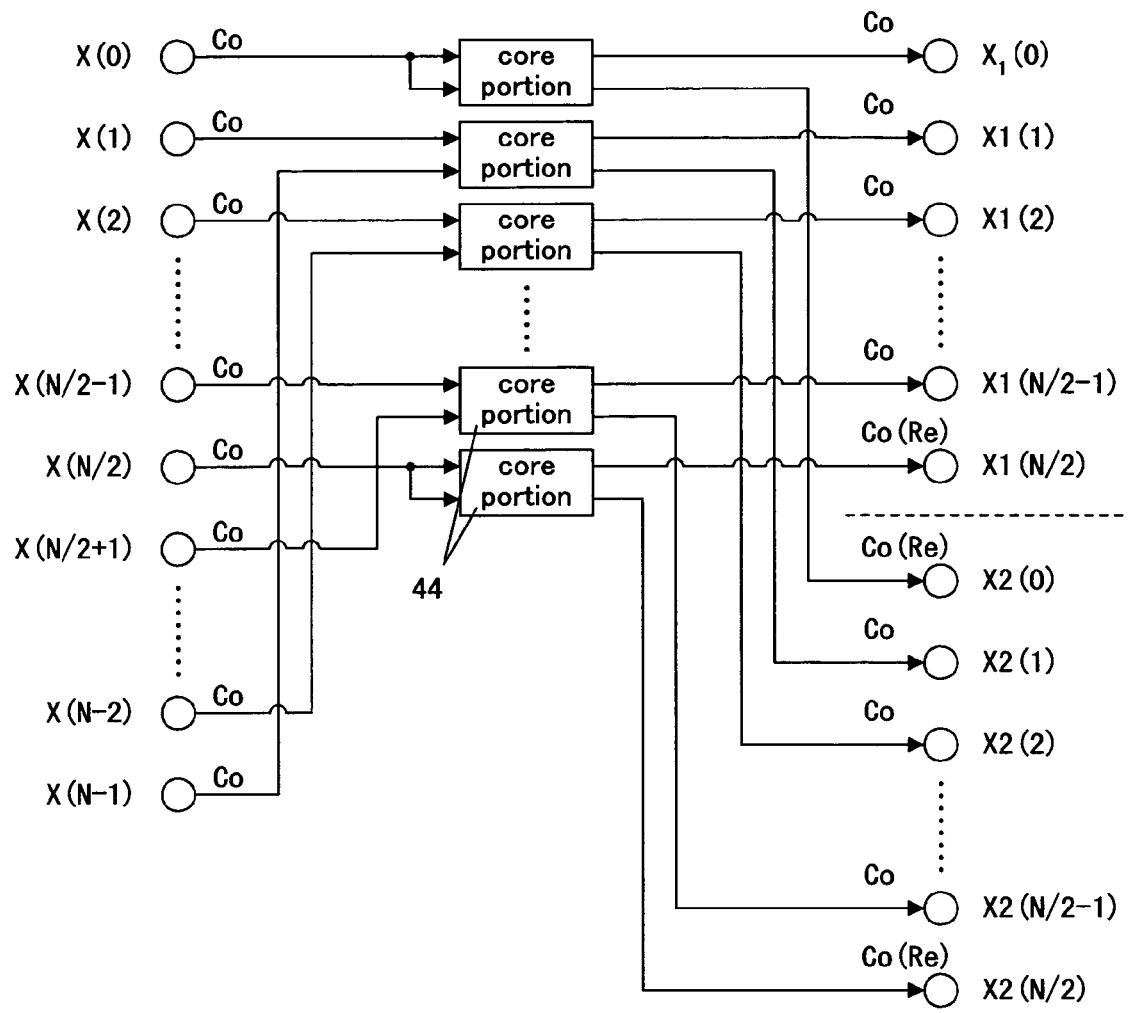
FIG. 6(a) is a block diagram illustrating a splitter according to the second embodiment.
Figure 6B:
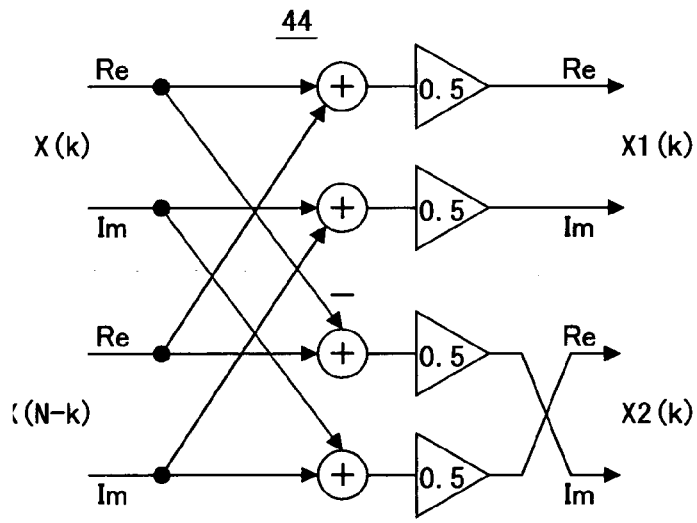
FIG. 6(b) is a block diagram illustrating a core portion according to the second embodiment.

More specifically, as illustrated in FIG. 6(a), a series of input signals (X(0), X(1) to X(N−1)) may be connected to a series of output signals (X1(0) to X1(N/2), X2(0) to X2(N/2)) using core portions 44 as illustrated in FIG. 6(b).

As illustrated in FIG. 6(a), the output from the splitter 43 covers only from "zero" to "N/2" because output greater than "N/2" may be deleted. This is because original series of signals "x1", "x2" are series of real numbers, and have the following properties:

$$X1(k)=X1(N-k);\text{ and}$$

$$X2(k)=X2(N-k).$$

The following evaluates the number of times of calculation according to the present embodiment. The number of times of calculation according to the overlap-save method is substantially similar to that according to the overlap-add method.

According to the present embodiment, four convolutions are executed when the FFT, splitter processing, vector addition, and IFFT are each practiced once, and when the vector multiplication is practiced twice. The number of times of calculation per unit time for each of M(=N−L)-numbers of samples is:

FFT complex multiplication (N/2) Log2 (N−1);
Complex addition N Log2 (N);
Splitter complex addition N;
Vector multiplication complex multiplication 2N;
Vector addition complex addition N;
IFFT complex multiplication (N/2) Log2 (N−1); and
Complex addition N Log2 (N)

The total number of times of calculation is:
Complex multiplication N Log2 (N−1)+2N; and
Complex addition 2N Log2 (N)+2N The above shows that the calculation according to the present embodiment is twice as fast as that according to the prior art.

The following discusses a comparison between the signal-processing method according to the present embodiment and the prior art improved method. For a two-input, two-output system, the number of times of calculation for each of 2M-numbers of samples according to the prior art improved method is:

Complex multiplication 2N Log2 (N−1)+4N; and
Complex addition 4N Log2 (N)+2N.

Similar to the previous embodiment, however, new "N" as given below must be a FFT window length: N=(M/2+L)

Consequently, the number of times of calculation for each of M-numbers of samples according to the prior art improved method is:

Complex multiplication (M+2L) Log2 (M/2+L−1)+2(M+2L); and
Complex addition 2 (M+2L) Log2 (M/2+L)+(M+2L).

Meanwhile, in the signal-processing apparatus according to the present embodiment, "N", "M", and "L" meet the following relationship: N=M+L As a result, the number of times of calculation for each M-numbers of samples according to the present embodiment is:

Complex multiplication (M+L) Log2 (M+L−1)+2(M+L); and
Complex addition 2 (M+L) Log2 (M+L)+2(M+L).

To compare the above two different results with one another, 2048 and 4096 are substituted for "M" and "L", respectively, in accordance with the following typical values: M=2048, L=4096

As a result, the number of times of calculation according to the prior art improved method is:
Complex multiplication 146654; and
Complex addition 262587.

Meanwhile, the number of times of calculation according to the present embodiment is:
Complex multiplication 89609; and
Complex addition 166929.

As a result, the number of times of calculation per unit time according to the present embodiment is reduced by some 38%, when compared with the prior art improved method, and the two-input, two output system is higher in reduction percentage than the one-input, two-output system.

As described above, according to the present embodiment, one of the two series of input signals "x1", "x2" and the other thereof are fed into the FFT unit through the real number input portion and the imaginary number input portion, respectively, and the FFT of the inputs is practiced to provide a FFT output. The splitter 43 separates the FFT output into one component and another. Each of the separated components is multiplied by a corresponding coefficient. The coefficients are similar to those according to the previous embodiment. As a result, a reduced amount of calculation per unit time is achievable in a multiple-input, multiple-output system.

Third Embodiment

A signal-processing apparatus according to a third embodiment is now described with reference to FIG. 7.

Similarly to the second embodiment, the signal-processing apparatus according to the present embodiment is of a two-input, two-output type. The signal-processing apparatus according to the present embodiment is operated as illustrated in FIG. 3 when an overlap-save method is employed, but is worked as illustrated in FIG. 4 when an overlap-add method is used.

However, the present embodiment differs from the previous embodiments in terms of an "A"-unit in the vector-multiplying unit of FIG. 5. A vector-multiplying unit according to the present embodiment is free of a splitter.

Figure 7A:
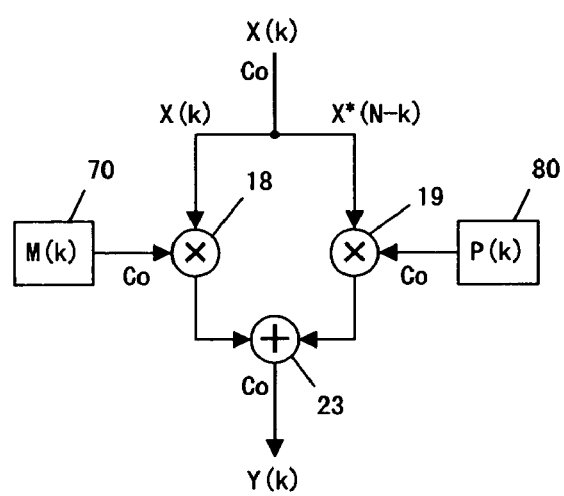
FIG. 7(a) is a block diagram illustrating a vector-multiplying unit according to a third embodiment.

FIG. 7(a) is a block diagram illustrating the vector-multiplying unit according to the present embodiment. An initial description is made as to principles under which the vector-multiplying unit operates.

In calculation result "Y(k)", assume that components relating to series of input signals "x1"- and "x2" are taken as "$Y1(k)$" and "$Y2(k)$", respectively.

At this time, "$Y1(k)$" and "$Y2(k)$" are expressed as:

$$Y1(k)=H11(k)X1(k)+H21(k)X2(k);\text{ and}$$

$$Y2(k)=H12(k)X1(k)+H22(k)X2(k).$$

Assume that the following definitions are made:

$$Y(k)=Y1(k)+jY2(k);$$

$$H1(k)=H11(k)+jH12(k);\text{ and}$$

$$H2(k)=H21(k)+jH22(k).$$

Accordingly, calculation result "Y(k)" can be expressed as below:

$$Y(k)=H1(k)X1(k)+H2(k)X2(k)$$

As described in the previous embodiments, data "X1(k)" and "X2(k)" are expressed as follows:

$$X1(k)=\{X(k)+X^*(N-k)\}/2; \text{ and}$$

$$X2(k)=\{X(k)-X^*(N-k)\}/2.$$

Accordingly, "Y(k)" is reformable as:

$$Y(k) = H1(k)\{X(k) + X*(N - k)\}/2 - jH2(k)\{X(k) - X*(N - k)\}/2$$
$$= \{H1(k) - jH2(k)\}X(k)/2 + \{H1(k) + jH2(k)\}X*(N - k)/2$$

More specifically, assume that coefficient vectors "M(k)" and "P(k)" are defined as follows:

$$M(k)=\{H1(k)-jH2(k)\}/2=\{H11(k)+H22(k)\}/2+j\{H12(k)-H21(k)\}/2; \text{ and}$$

$$P(k)=\{H1(k)+jH2(k)\}/2=\{H11(k)-H22(k)\}/2+j\{H12(k)+H21(k)\}/2.$$

Accordingly, calculation result "Y(k)" is identified as:

$$Y(k)=M(k)X(k)+P(k)X^*(N-k).$$

Figure 7B:
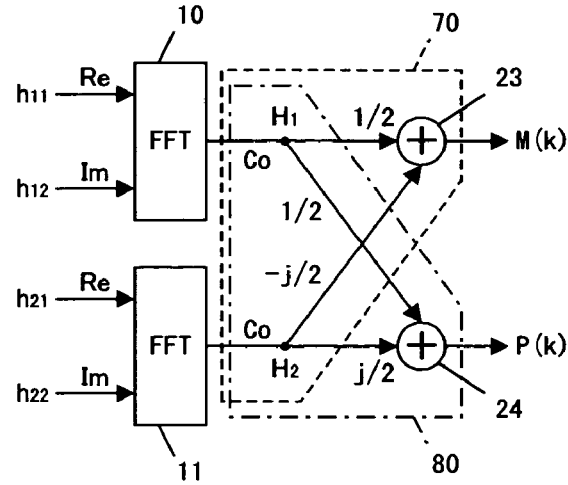
FIG. 7(b) is a block diagram illustrating a third coefficient vector-supplying unit according to the third embodiment.
Figure 7C:
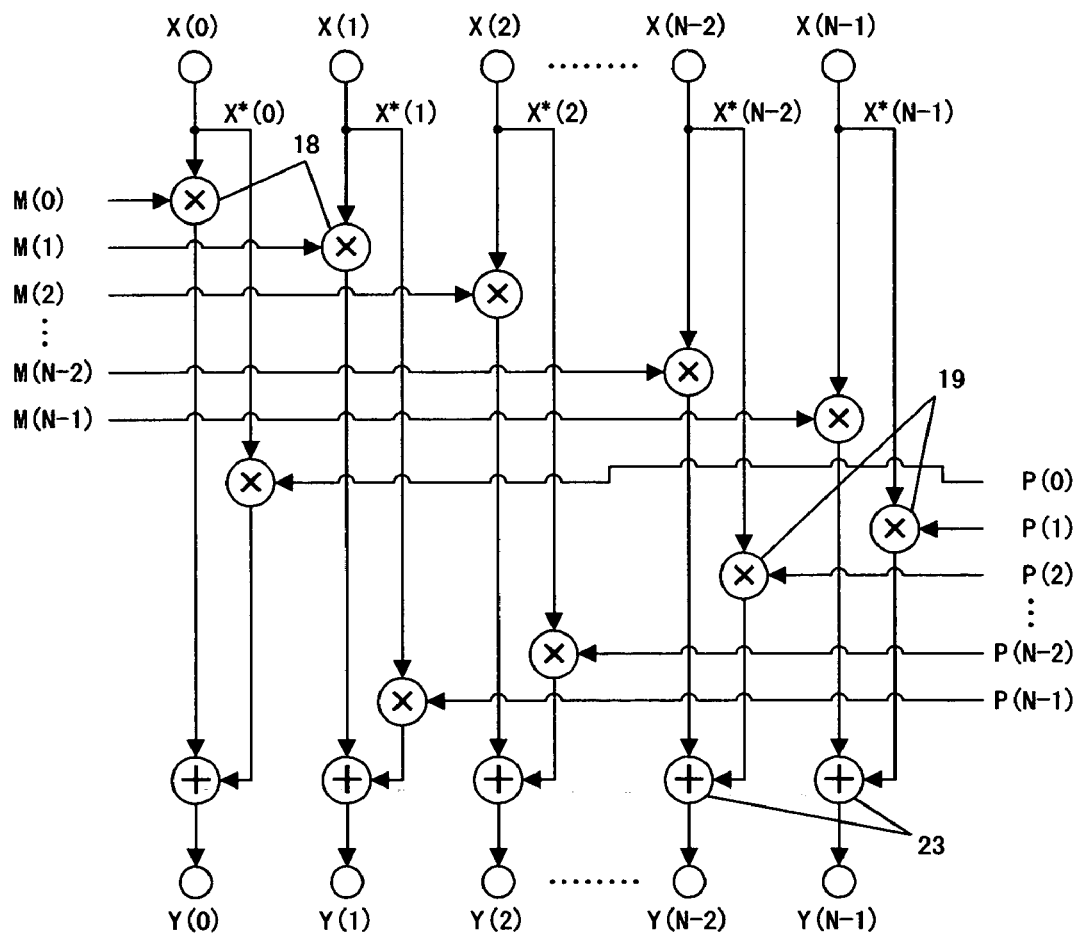
FIG. 7(c) is a block diagram illustrating a vector-multiplying unit according to the third embodiment.

When the vector-multiplying unit 90 is constructed as illustrated in FIG. 7(*a*) in accordance with the above relational expression, then a vector-multiplying unit including a processing unit comparable to the "A"-unit of FIG. 5, but excluding a splitter is achievable.

In FIG. 7(*a*), a fourth coefficient vector storage unit 70 operable to supply coefficient vector "M(k)" and a fifth coefficient vector storage unit 80 operable to supply coefficient vector "P(k)" can be constructed to perform cross-multiplication as illustrated in FIG. 7(*b*) using adders 23, 24.

FIG. 7(*c*) illustrates exemplary connections between a series of input signals (X(0), X(1) to X(N−1)) and a series of output signals (Y(0), Y(1) to Y(N−1)).

The number of times of calculation according to the present embodiment is reduced by an amount of splitter processing, when compared with that according to the second embodiment. The following evaluates the number of times of calculation according to the present embodiment. The number of times of calculation based on the overlap-save method is similar to that based on the overlap-add method.

The number of times of calculation per unit time for each of M(=N−L)-numbers of samples is:

FFT complex multiplication (N/2) Log2 (N−1);
Complex addition N Log2 (N);
Vector multiplication complex multiplication 2N;
Vector addition complex addition N;
IFFT complex multiplication (N/2) Log2 (N−1); and
Complex addition N Log2 (N).

The total number of times of calculation is:
Complex multiplication N Log2 (N−1)+2N; and
Complex addition 2N Log2 (N)+N.

As a result, the number of times of complex addition according to the present embodiment is reduced by an amount of "N", when compared with that according to the second embodiment.

Fourth Embodiment

A signal-processing apparatus according to a fourth embodiment is now described with reference to FIG. 8.

Figure 8A:
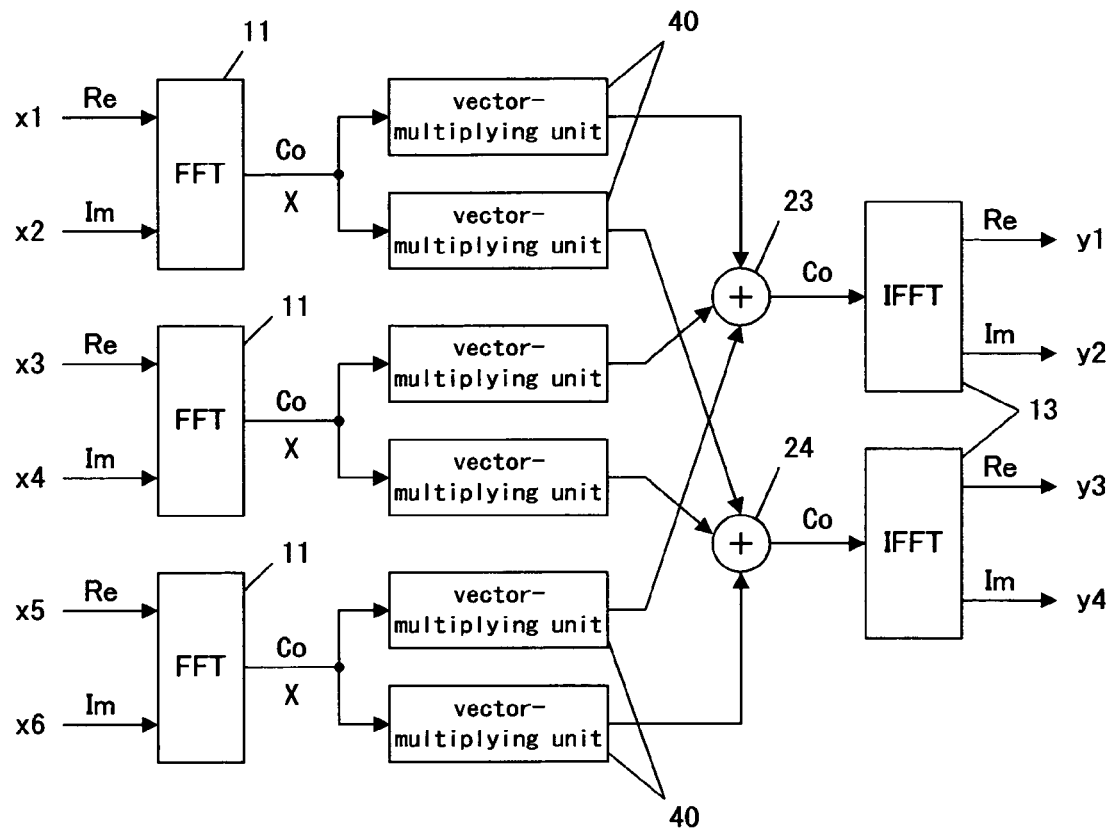
FIG. 8(a) is a block diagram illustrating a six-input, four-output signal-processing apparatus according to a fourth embodiment.
Figure 8B:
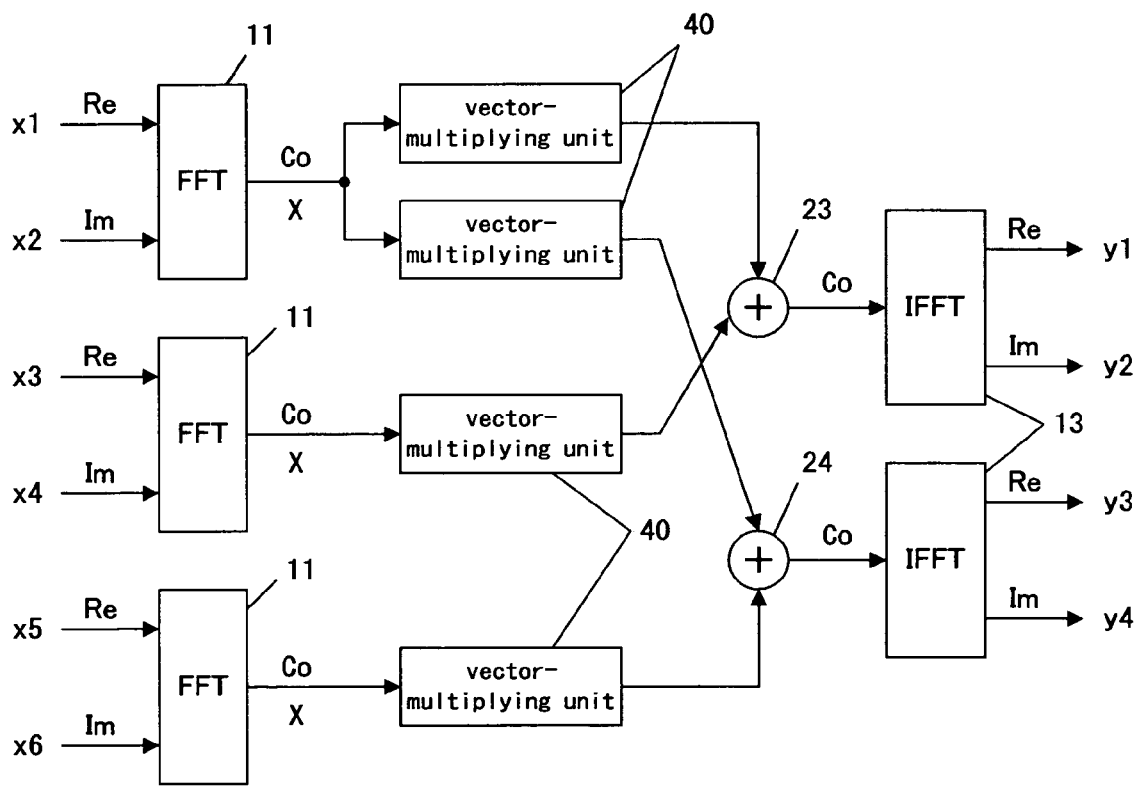
FIG. 8(b) is a block diagram illustrating a six-input, four-output signal-processing unit according to the fourth embodiment.

FIG. 8(*a*) illustrates a six-input, four-output signal-processing apparatus as an exemplary multiplex-input, multiplex-output system. Although not illustrated in FIG. 8(*a*), the following steps are made: an overlap in a series of input signals and the discard of samples at the head of a series of output signals when the overlap-save method is employed; and the addition of zero to the series of input signals and an overlap addition to the series of output signals when the overlap-add method is employed.

As illustrated in FIG. 8(*a*), the following focuses on each set of two series of input signals. There are provided three complex series, each of which having a real part and an imaginary part, respectively. A FFT unit 11 performs the FFT of each of the three complex series, thereby transforming a series of time-domain signals into a series of frequency-domain signals "X's".

There are provided sufficient numbers of vector-multiplying units 40 for all pathways. The vector-multiplying unit 40 may be either of a type according to the second embodiment or of a type according to the third embodiment or otherwise may be of a mixture therebetween.

The vector-multiplying units 40 provide calculation results "Y's", which are added together by adders 23, 24, thereby providing addition results. IFFT units 13 inversely transform the addition results into series of time-domain output signals "y1", "y2", "y3", and "y4".

As described above, the multiple-input, multiple-output signal-processing apparatus is achievable by the use of: the FFT units whose the number of quantity is equal to a half of the number of channels of the series of input signals; the adders whose the number of quantity is equal to the number of channels of the series of output signals; the IFFT whose the number of quantity is equal to the number of channels of the series of output signals; and the vector-multiplying unit whose the number of quantity is equal to the product of the number of quantity of the FFT units and that of the IFFT units.

Even with a multiple-input, multiple-output convolution, there are sometimes passages that non-require the convolution. In this event, as illustrated in FIG. 8(*b*), some of the vector-multiplying units may be deleted in accordance with such passages.

Fifth Embodiment

An exemplary signal-processing apparatus according to a fifth embodiment is now described with reference to FIG. 9.

Figure 9:
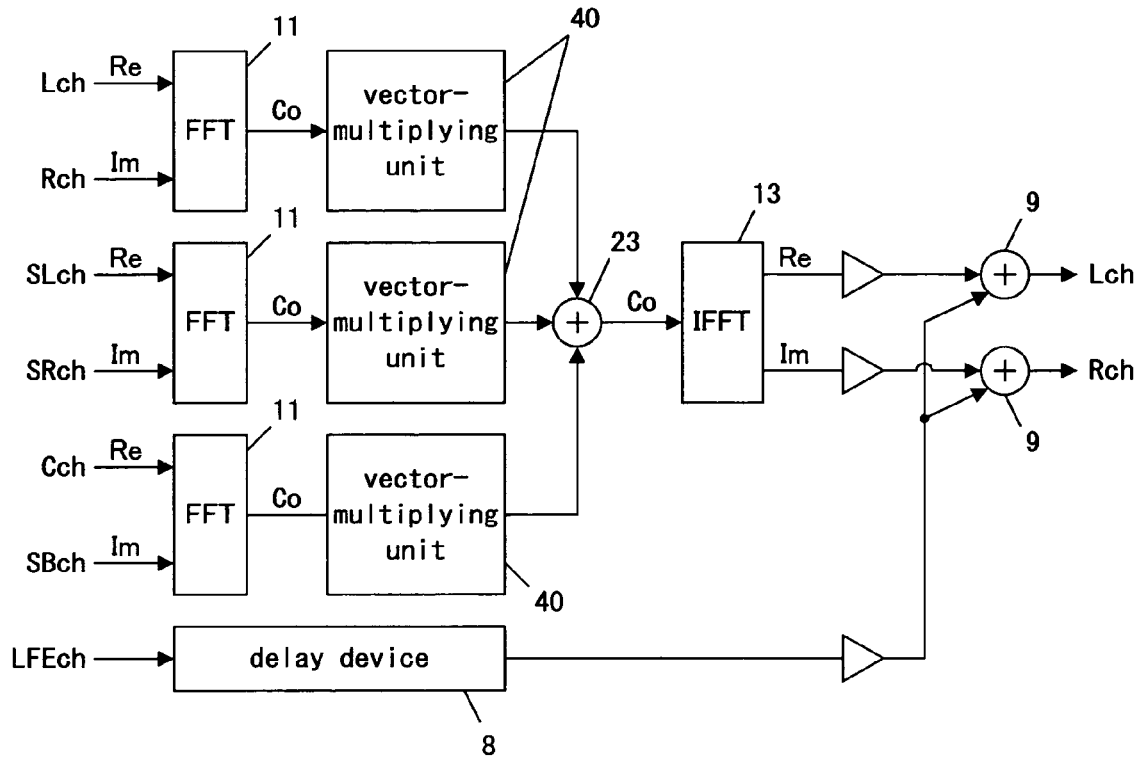
FIG. 9 is a block diagram illustrating a virtual surround-sound apparatus according to a fifth embodiment.

FIG. 9 illustrates a virtual surround-sound system operable to produce, using two front speakers or a headphone, an acoustic field similar to that provided by multi-channel audio signals.

The virtual surround-sound system according to the present embodiment is of a type called a 6.1-channel that includes six-input channels plus a deep bass-dedicated input channel (LFEch). The six-input channels include: a left channel (Lch); a right channel (Rch); a surround left channel (SLch); a surround right channel (SRch); a center channel (Cch); and a surround back channel (SBch).

The signal-processing apparatus of FIG. 9 is operable to down-mix the inputs onto just two-output channels (left and right channels (Lch), (Rch)). Pursuant to the present embodiment, usual down-mix is not practiced, but filtering or convolution calculation is performed using a filter, thereby practicing the above down-mix. The filter is calculated based on a head transmission function that shows variations in sound in the course of acoustic transmission from a position of a sound source to human ears.

A set of Lch and Rch, a set of SLch and SRch, and a set of Cch and SBch are connected to corresponding FFT units 11. In each of the sets, one of the channels and the other thereof are coupled to a real number portion and imaginary number portion of the FFT unit 11, respectively. In this system, the inputs are fed into the FFT units 11 to practice FFT thereof, thereby transforming them into frequency-domain data vectors "X's". Each of data vectors "X's" is calculated in a corresponding vector-multiplying unit 40. The calculation made by the vector-multiplying unit 40 is comparable to the filtering. An adder 23 adds the calculation results together, thereby providing an addition result. An IFFT 13 performs the IFFT of the addition result.

As a result, a series of time-domain signals is obtained. A real part and an imaginary part of the series of time-domain signals are comparable to "Lch" and "Rch", respectively. A delay device 8 produces a delay signal based on the LFEch-signal. The delay signal is multiplied by a proper coefficient. The multiplication result is added to the Lch- and Rch-series of signals. As a result, series of output signals in two channels are provided.

The above steps realize a low cost virtual surround-sound system that requires a fewer number of times of calculation.

According to the present embodiment, the pairs of Lch/Rch, SLch/SRch, and Cch/SBch are provided. Alternatively, the channels may be paired together in other ways. For example, a pair of Lch and SLch as well as a pair of Rch and SRch is acceptable.

The LFEch-signal is delayed in the time domain, but is added to the different a series of signals near the output of the signal-processing apparatus according to the present embodiment. Alternatively, such a step may be replaced by a convolution using the FFT unit.

Sixth Embodiment

A signal-processing apparatus according to a sixth embodiment is now described with reference to FIG. 10 to FIG. 16.

Figure 10:
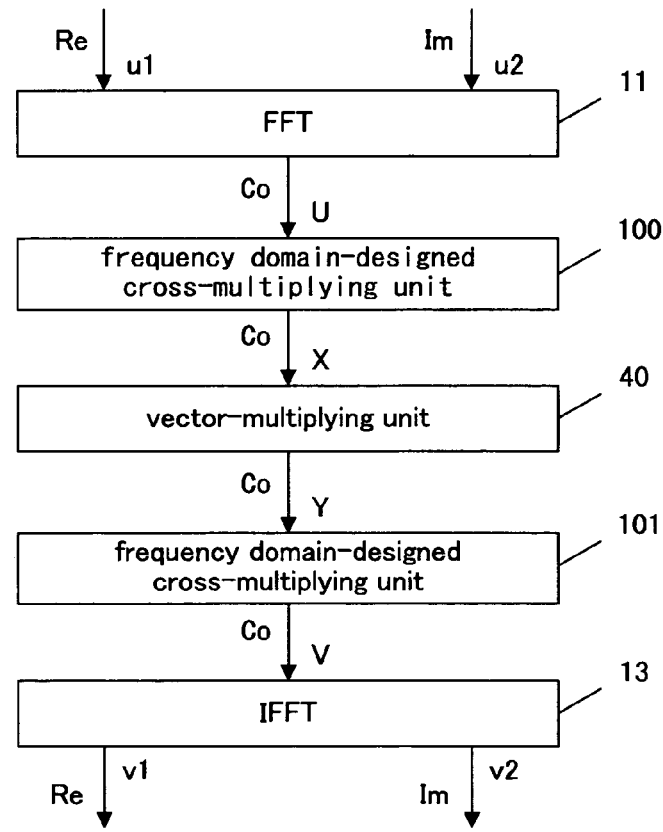
FIG. 10 is a block diagram illustrating a signal-processing unit according to a sixth embodiment.

FIG. 10 is a block diagram illustrating the signal-processing apparatus according to the present embodiment. As illustrated in FIG. 10, the present embodiment provides frequency domain-designed cross-multiplying units 100, 101 at both sides of a vector-multiplying unit 40.

The following discusses specific examples of the frequency domain-designed, cross-multiplying units 100, 101. Initial descriptions are made as to exemplary several combinations of a splitter 43 and the frequency domain-designed, cross-multiplying units 100, 101 with reference to FIG. 11 to FIG. 14. The splitter 43 is the same as one of FIG. 5.

Figure 11A:
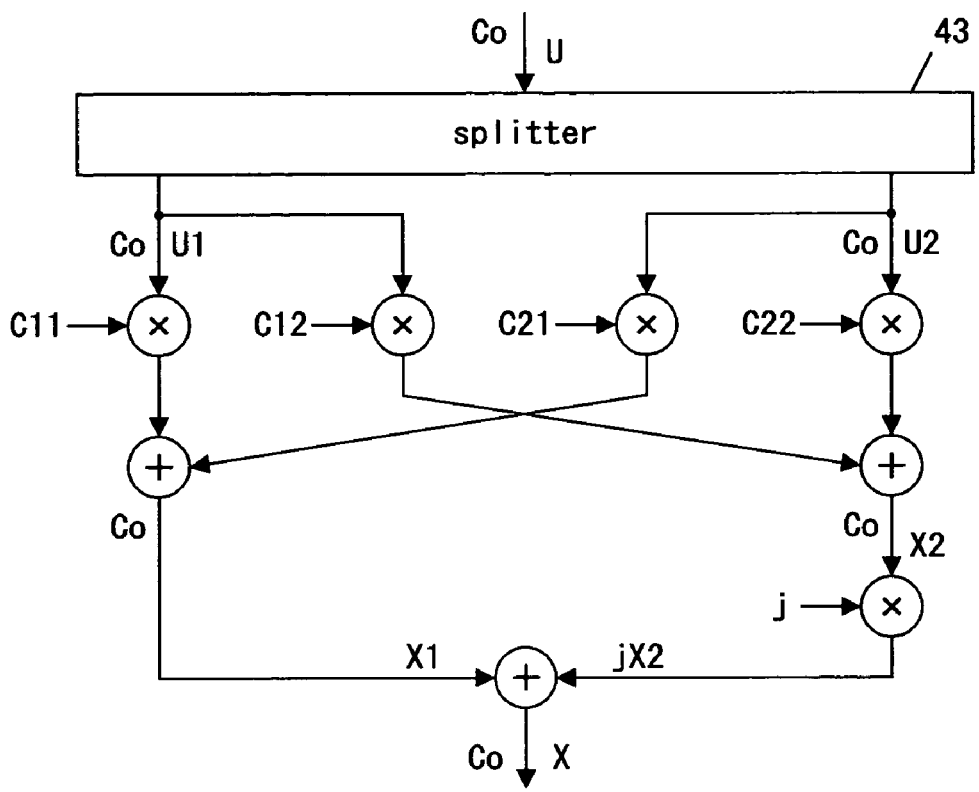
FIG. 11(a) is a block diagram illustrating frequency domain-designed, cross-multiplying units according to the sixth embodiment.
Figure 11B:
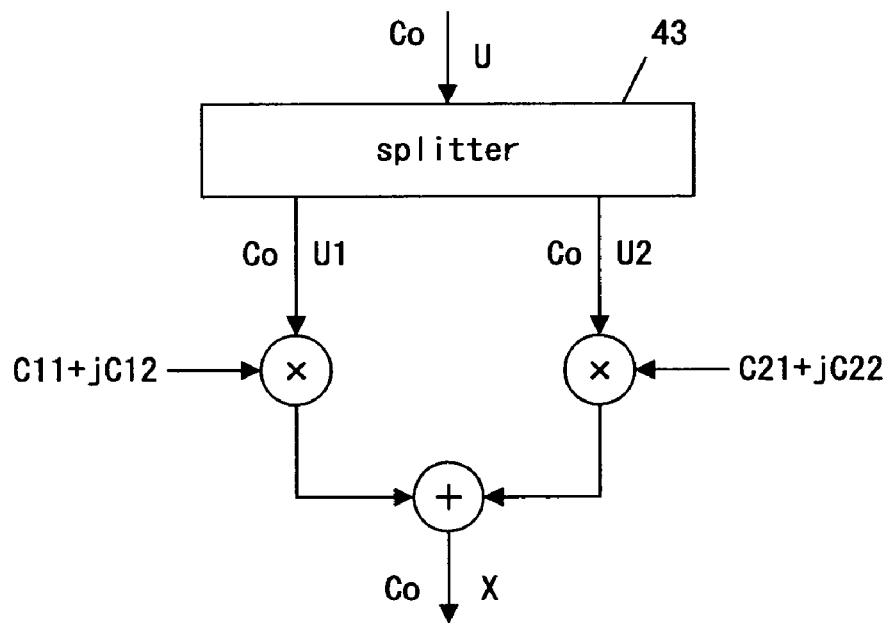
FIG. 11(b) is a block diagram illustrating frequency domain-designed, cross-multiplying units according to the sixth embodiment.

FIG. 11 is a block diagram illustrating a feed-forward type of frequency domain-designed, cross-multiplying units 100, 101. In FIG. 11(*a*), the splitter 43 separates data vector "U" into two different components "U1", "U2". Steps after the processing of the splitter 43 employ scalar coefficients "C11", "C12", "C21", and "C22", which are the same as time-domain scalar coefficients. Two different components "U1", "U2" are multiplied by scalar coefficients "C11", "C12", "C21", and "C22" to perform cross-multiplication therebetween.

Alternatively, as illustrated in FIG. 11(*b*), scalar coefficients "C11" to "C22" may be combined with complex number "j".

Figure 12A:
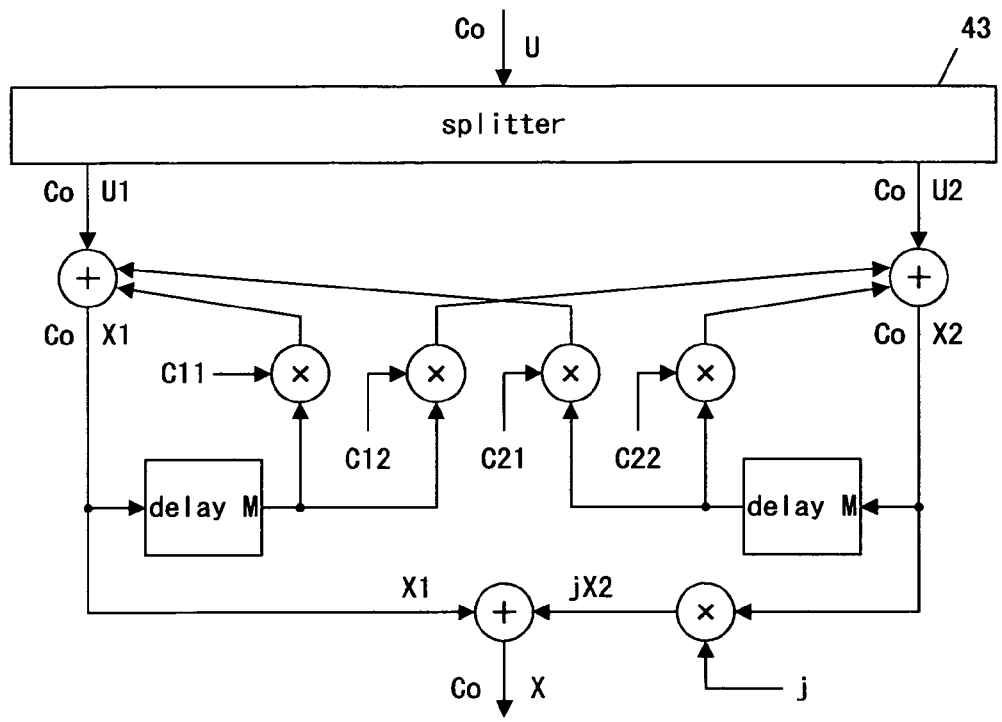
FIG. 12(a) is a block diagram illustrating frequency domain-designed, cross-multiplying units according to the sixth embodiment.
Figure 12B:
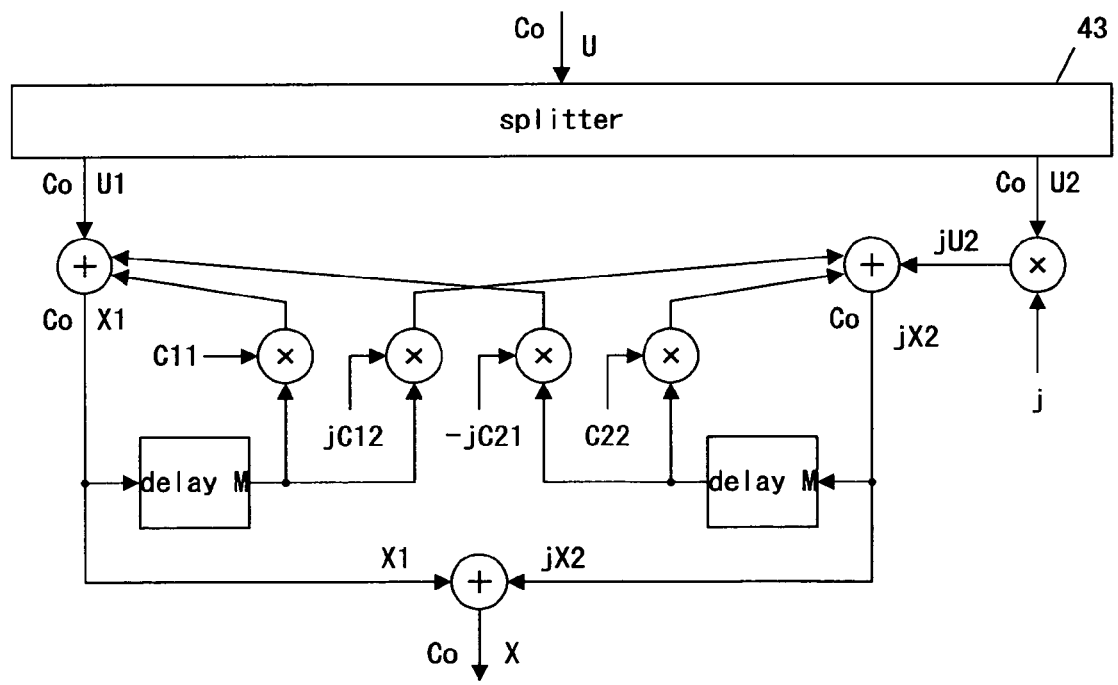
FIG. 12(b) is a block diagram illustrating frequency domain-designed, cross-multiplying units according to the sixth embodiment.
Figure 13:
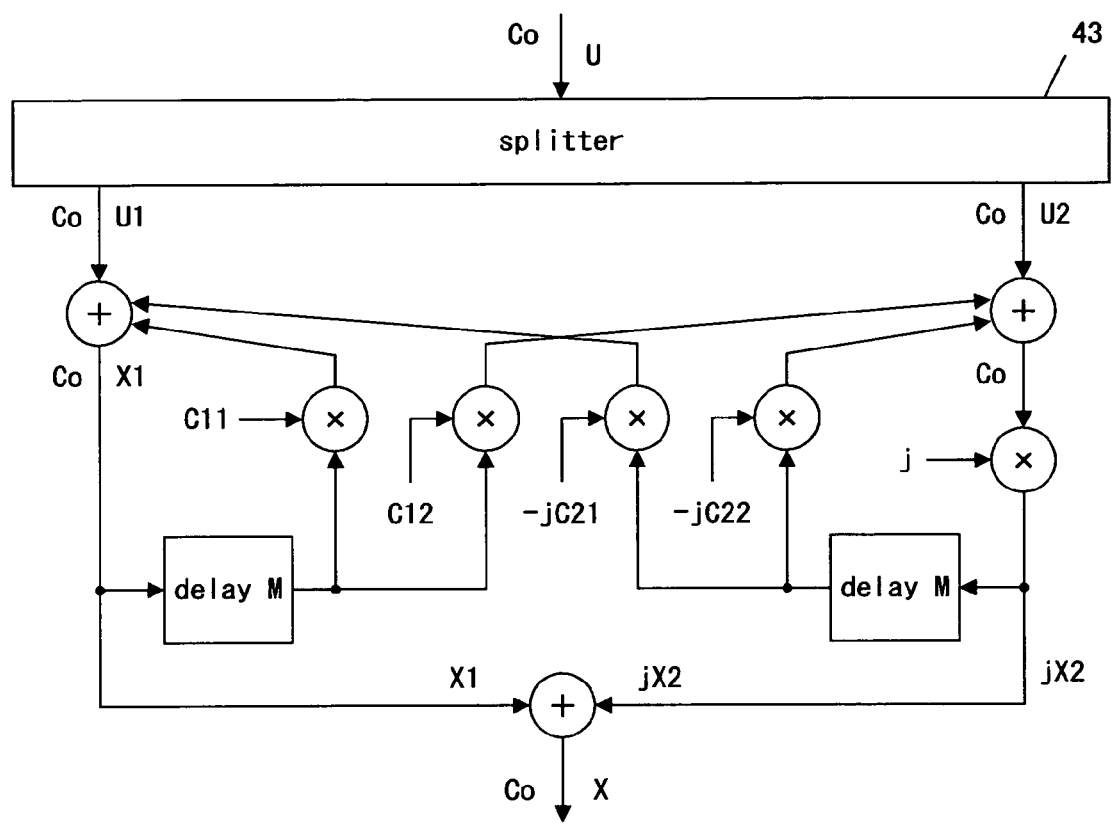
FIG. 13 is a block diagram illustrating frequency domain-designed, cross-multiplying units according to the sixth embodiment.

A feedback type of frequency domain-designed, cross-multiplying units 100, 101 may be constructed as illustrated in FIG. 12(*a*), FIG. 12(*b*), and FIG. 13.

Figure 14A:
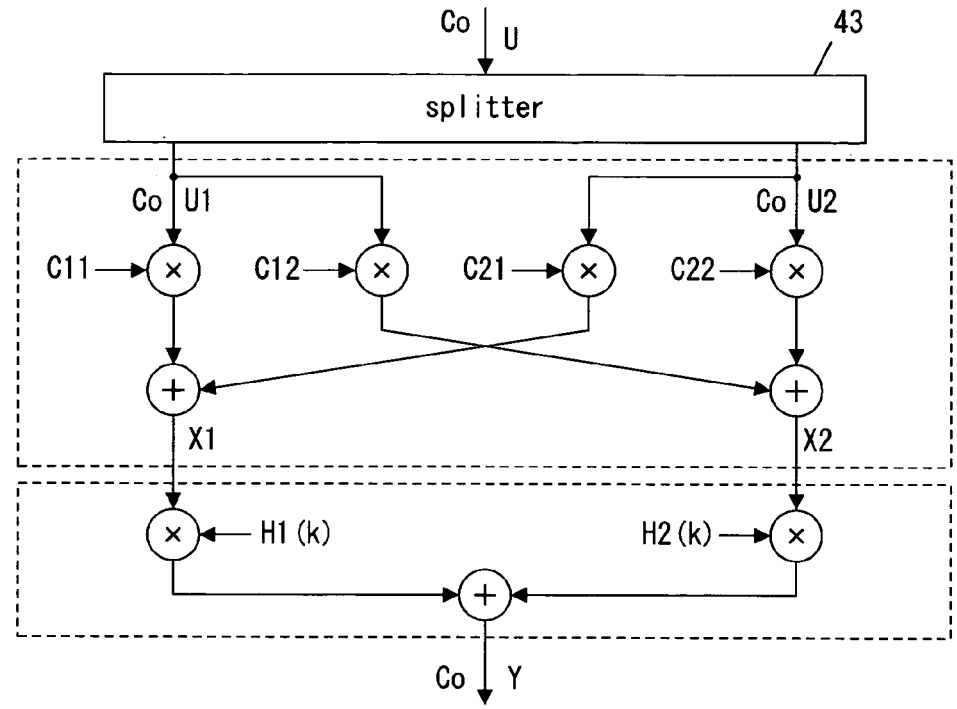
FIG. 14(a) is a block diagram illustrating a circuit in which frequency domain-designed, cross-multiplying units and vector-multiplying units share a splitter in accordance with the sixth embodiment.
Figure 14B:
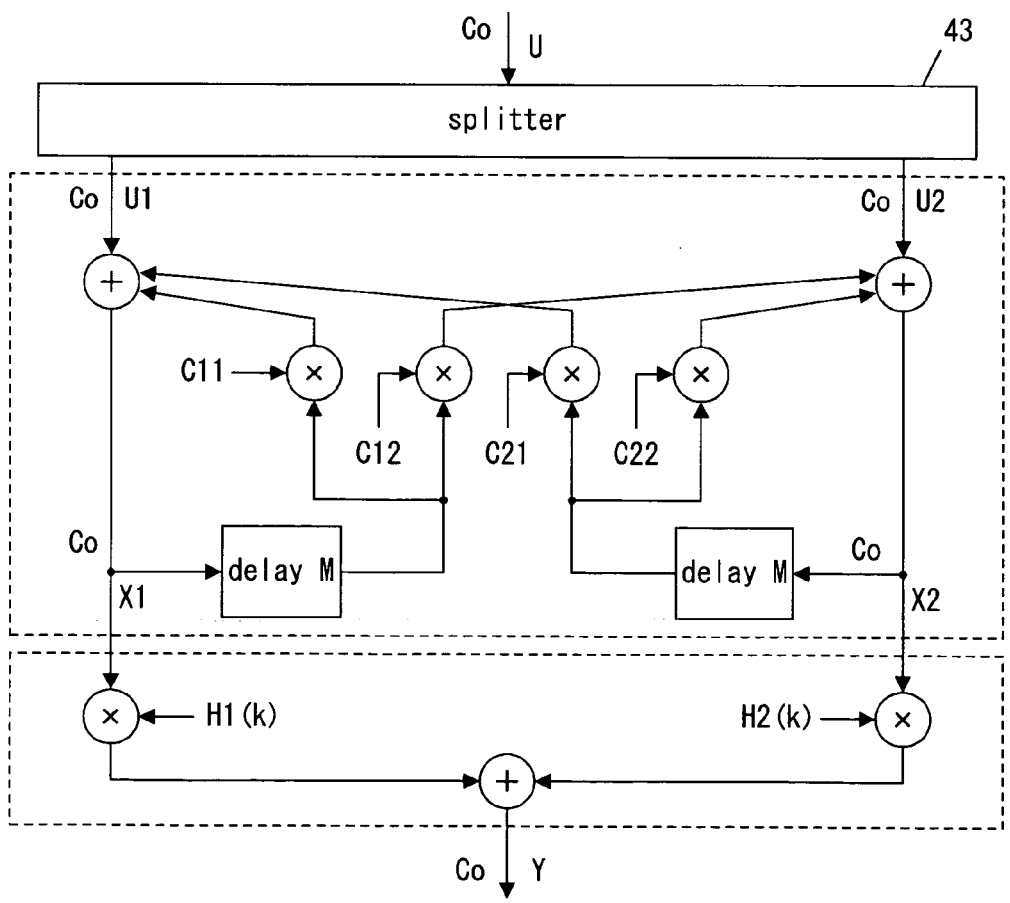
FIG. 14(b) is a block diagram illustrating a circuit in which frequency domain-designed, cross-multiplying units and vector-multiplying units share the splitter in accordance with the sixth embodiment.

When the frequency domain-designed, cross-multiplying units 100, 101 are connected to the vector-multiplying unit 40, then the frequency domain-designed, cross-multiplying units 100, 101 and the vector-multiplying unit 40 can share the splitter 43 in a manner as described later. The use of the shared splitter 43 provides a circuit as illustrated in FIG. 14(*a*) when the frequency domain-designed, cross-multiplying units 100, 101 are of the feed-forward type, but provides another circuit of FIG. 14(*b*) when the frequency domain-designed, cross-multiplying units 100, 101 are of the feedback type.

As discussed above, when the splitter 43 is shared by the frequency domain-designed, cross-multiplying units 100, 101 and the vector-multiplying unit 40, then the scale of a circuit and the number of times of calculation are reduced by an amount comparable to the single splitter 43.

Figure 15A:
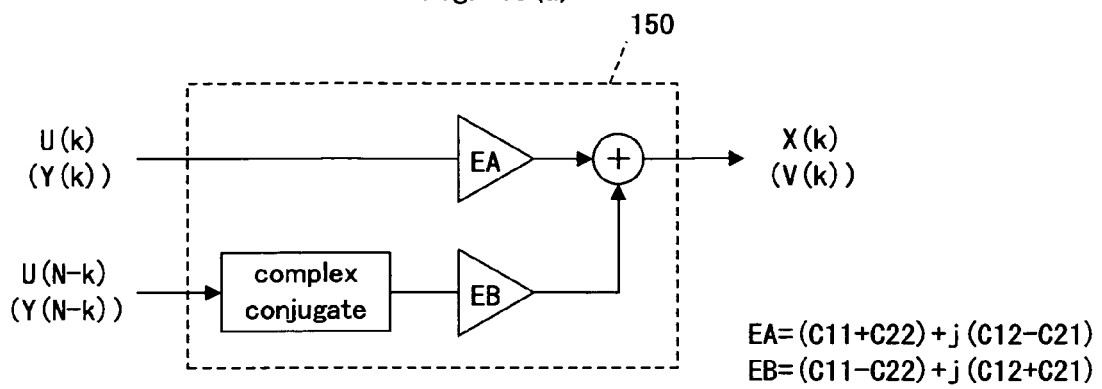
FIG. 15(a) is a block diagram illustrating a cross-multiplying core portion according to the sixth embodiment.
Figure 15B:
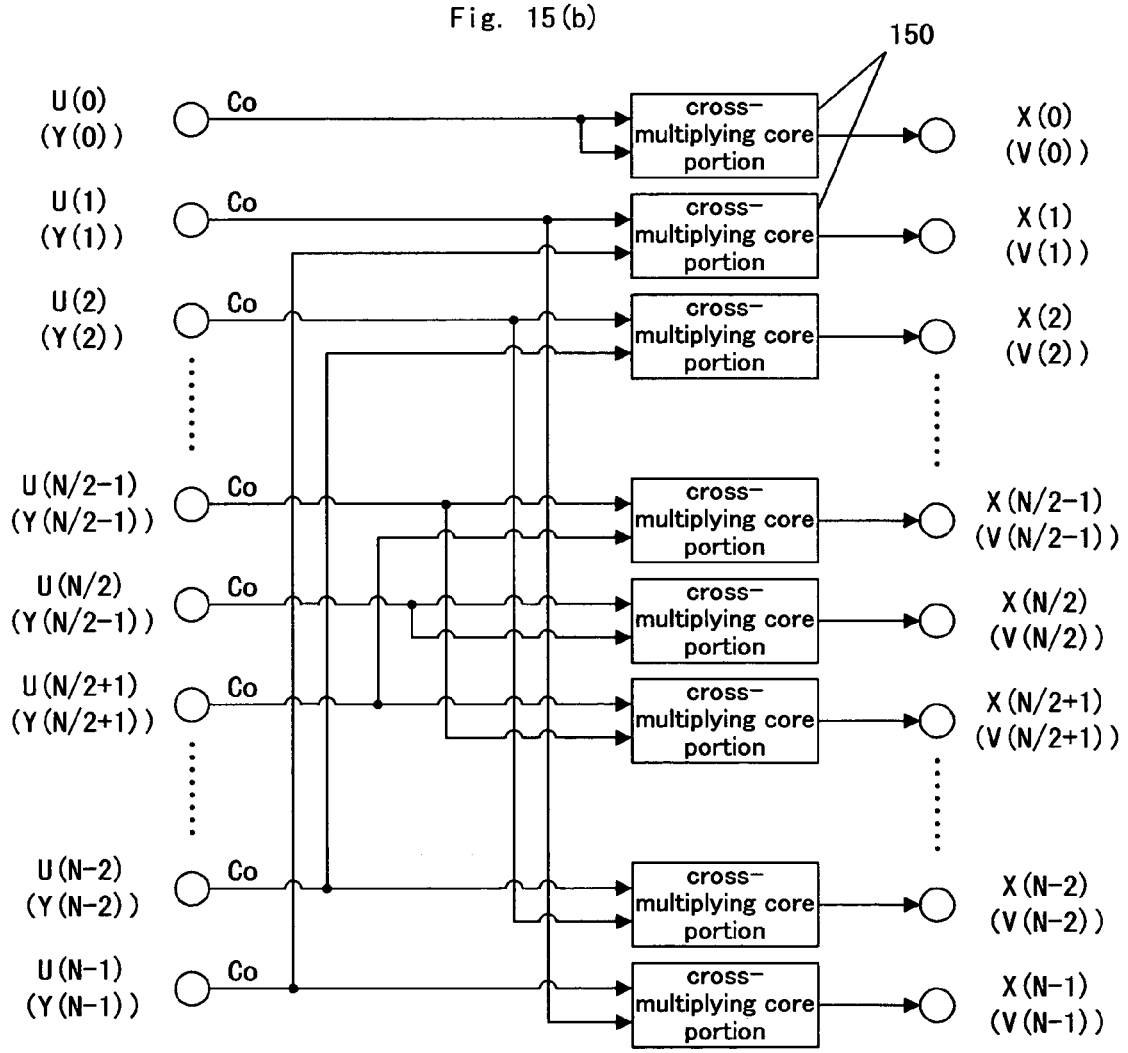
FIG. 15(b) is a block diagram illustrating a cross-multiplying core portion according to the sixth embodiment.
Figure 16A:
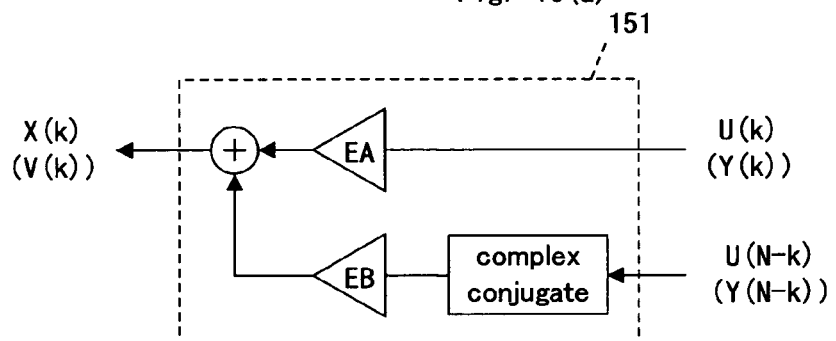
FIG. 16(a) is a block diagram illustrating a cross-multiplying core portion according to the sixth embodiment.
Figure 16B:
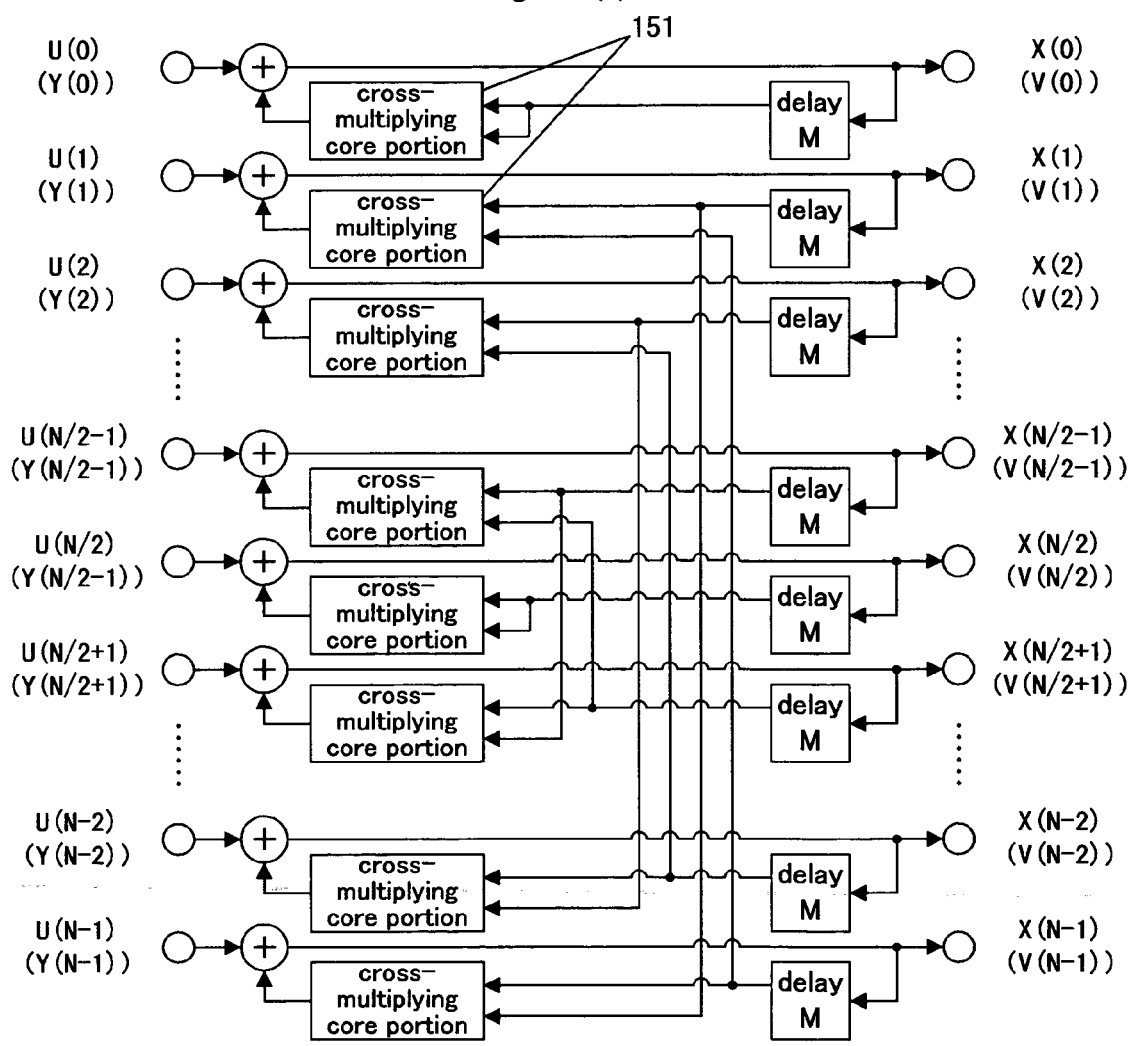
FIG. 16(b) is a block diagram illustrating a frequency domain-designed, cross-multiplying unit according to the sixth embodiment.

The following discusses, with reference to FIGS. 15 to 16, how the frequency domain-designed, cross-multiplying units 100, 101 are constructed without the splitter 43.

The feed-forward type of frequency domain-designed, cross-multiplying unit is initially described. Assume that the FFT of time-domain input signals "u1" and "u2" is performed to provide FFT results "U1($k$)" and "U2($k$)", respectively. Assume that "u1" and "u2" are fed into a FFT unit through a real number portion and imaginary number portion thereof, respectively, to practice the FFT of "u1" and "u2", thereby providing a FFT result "U(k)".

Similarly, assume that the IFFT of the cross-multiplied frequency domain signals "X1($k$)" and "X2($k$)" is practiced to provide IFFT results "x1" and "x2", respectively. Assume that the IFFT of the cross-multiplied frequency domain signal "X" is performed to provide IFFT results "x1" and "x2, in which "x1" and "x2 are fed out of an IFFT unit through a real number portion and imaginary number portion thereof, respectively.

At this time, "U1($k$)", "U2($k$)", and "U(k)" stand in the following relationship:

$U1(k) = \{U(k) + U^*(N-k)\}/2$; and $U2(k) = \{U(k) - U^*(N-k)\}/2j$.

The cross-multiplication using the four scalar coefficients provides the following relationship:

$X1(k) = C11 \cdot U1(k) + C21 \cdot U2(k)$; and $X2(k) = C12 \cdot U1(k) + C22 \cdot U2(k)$.

Assume that "X(k)" is expressed using "U(k)" and "U*(N−k)" in accordance with the following relational expression: $X(k) = X1(k) + jX2(k)$ The above assumption determines the following expression:

$X(k) = EA \cdot U(k) + EB \cdot U^*(N-k)$

However, "EA" and "EB" are defined as below.

$EA = (C11 + C22) + j(C12 - C21)$; and $EB = (C11 - C22) + j(C12 + C21)$.

The use of the above relationship allows the feed-forward type of frequency domain-designed, cross-multiplying units 100, 101 to be constructed as illustrated in FIG. 15. FIG. 15(*a*) illustrates a cross-multiplying core portion 150. FIG. 15(*b*) illustrates the entire frequency domain-designed, cross-multiplying unit.

Similarly, the use of the above relationship allows the feedback type of frequency domain-designed, cross-multiplying units 100, 101 to be constructed as illustrated in FIG. 16. FIG.

16(*a*) illustrates a cross-multiplying core portion 151. FIG. 16(*b*) illustrates the entire frequency domain-designed, cross-multiplying unit.

As described above, the present invention realizes frequency-domain cross-multiplication.

In actual cross-multiplication, symmetrical coefficients as shown below are often used.

$C11=C22$; and $C12=C21$.

In this instance, frequency domain coefficients meet the following relationship:

$EA=2 \cdot C11$; and $EB=j2 \cdot C12$.

The use of the above relationship provides a still fewer number of times of calculation.

Seventh Embodiment

Figures 17A, 17B, 17C:
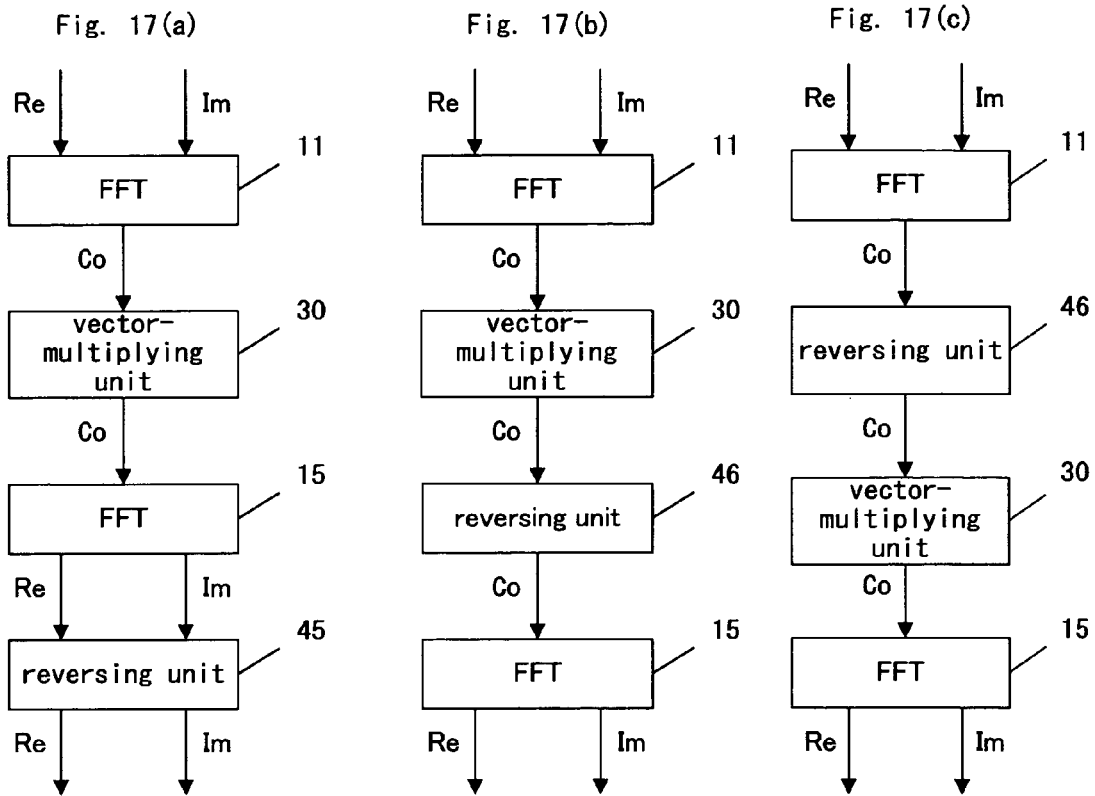
FIG. 17(a) is a block diagram illustrating a signal-processing unit according to the sixth embodiment.
FIG. 17(b) is a block diagram illustrating a signal-processing unit according to the sixth embodiment.
FIG. 17(c) is a block diagram illustrating a signal-processing unit according to the sixth embodiment.
Figures 18A, 18B:
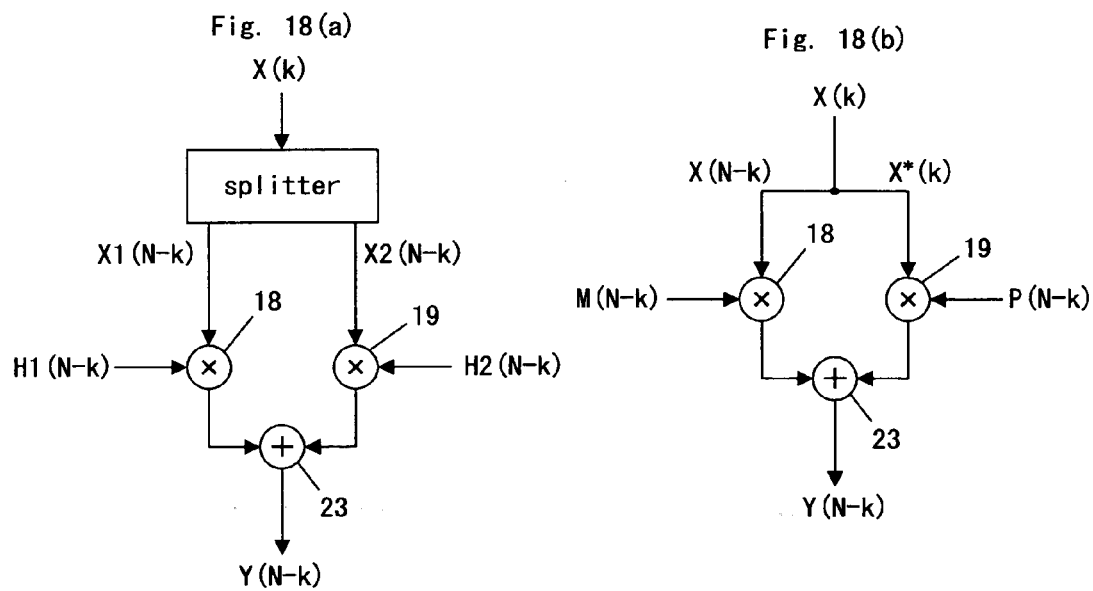
FIG. 18(a) is a block diagram illustrating a vector-multiplying unit according to the sixth embodiment.
FIG. 18(b) is a block diagram illustrating a vector-multiplying unit according to the sixth embodiment.
Figure 19A:
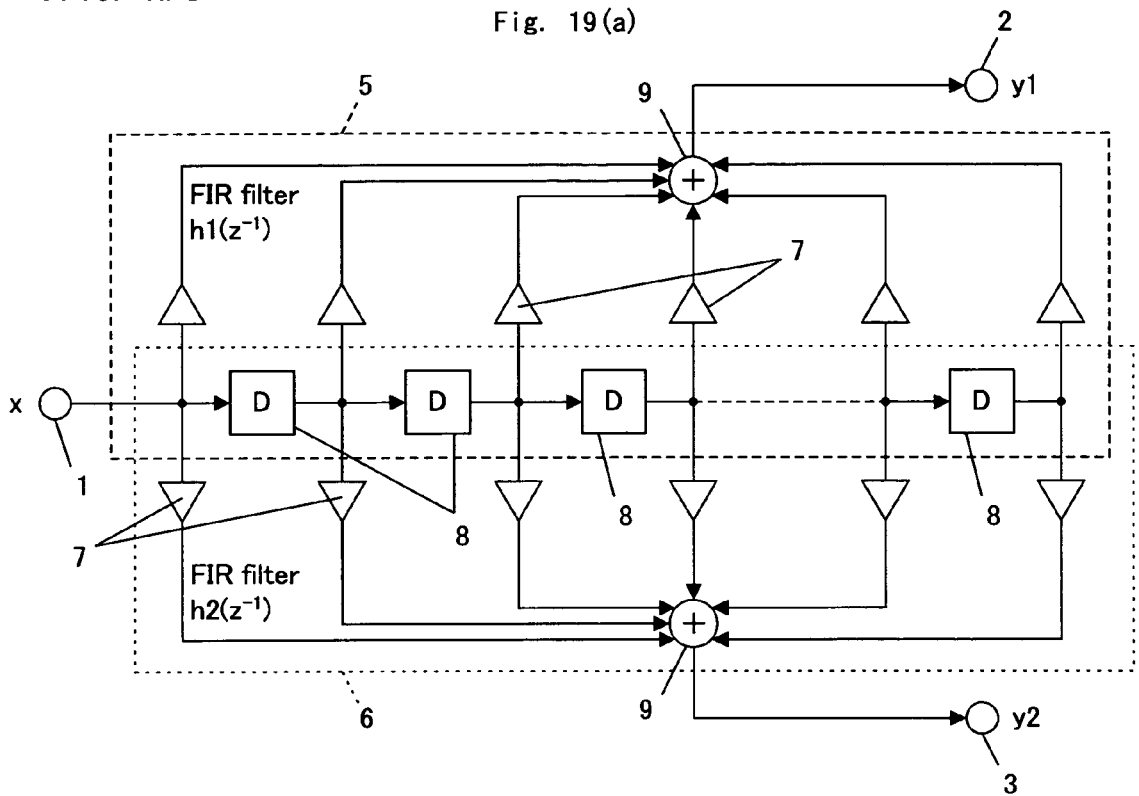
FIG. 19(a) is a block diagram illustrating a prior art signal-processing apparatus.
Figure 19B:
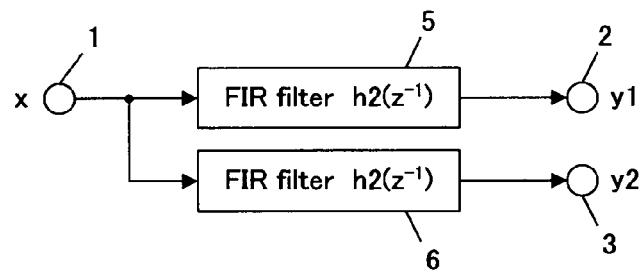
FIG. 19(b) is a block diagram illustrating the prior art signal-processing apparatus.
Figure 19C:
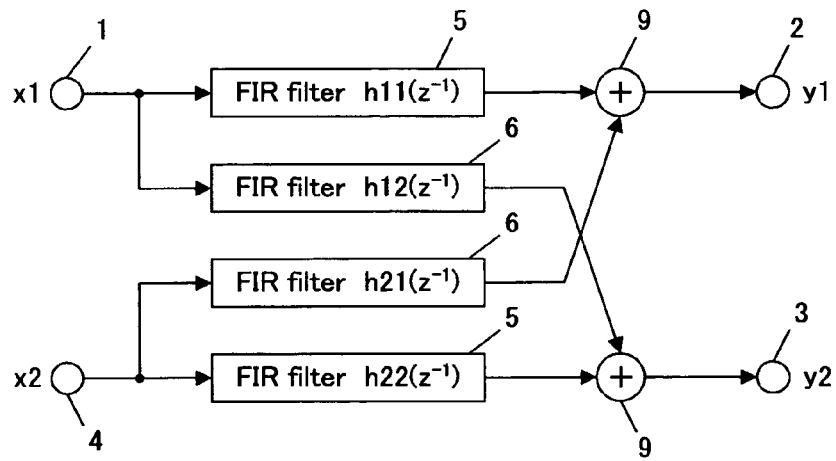
FIG. 19(c) is a block diagram illustrating a prior art signal-processing apparatus.
Figure 20:
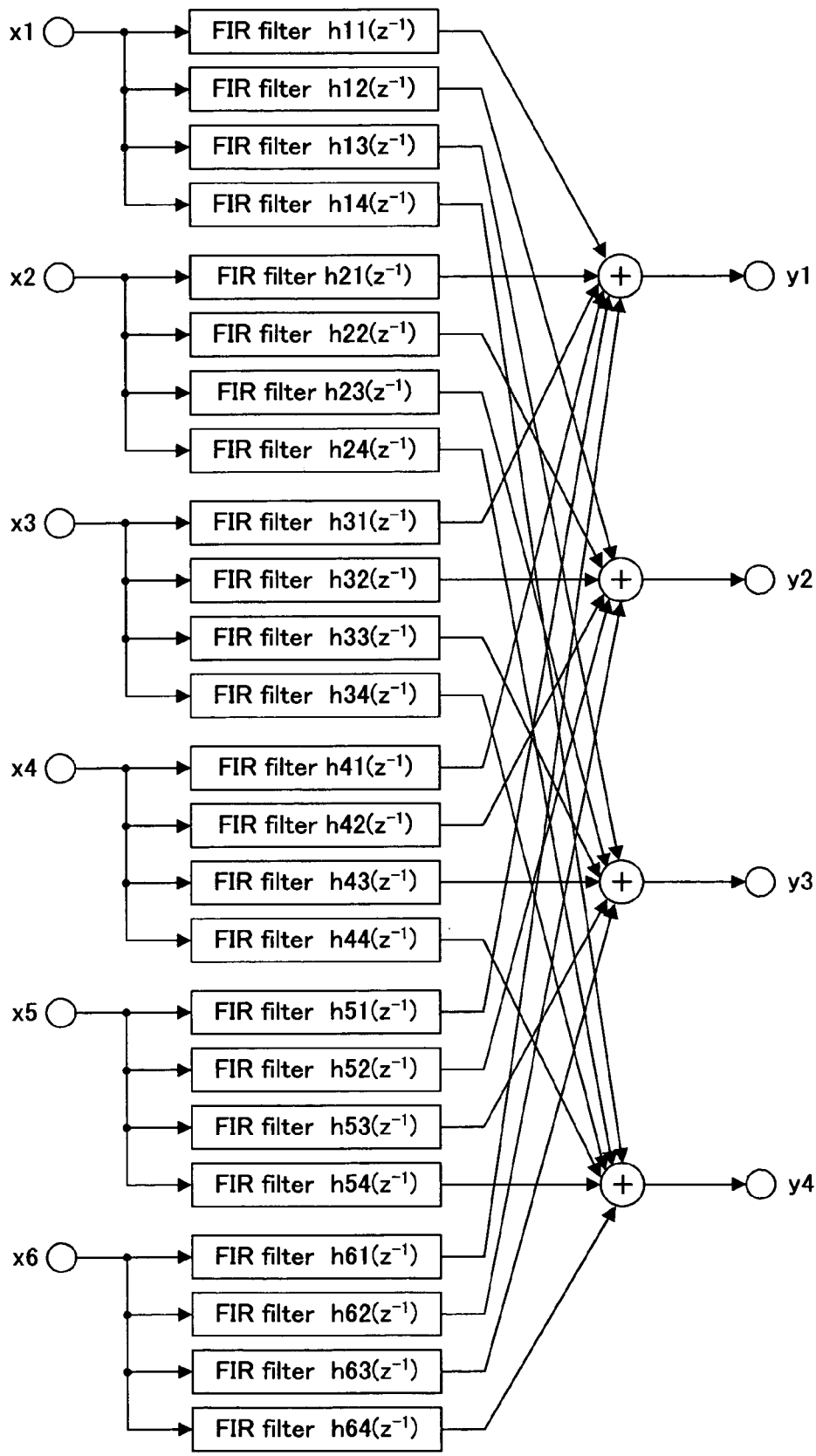
FIG. 20 is a block diagram illustrating a prior art signal-processing apparatus.

According to the first to sixth embodiments, the IFFT unit 13 is used to inversely transform calculation result "Y" into time-domain calculation results. Alternatively, as illustrated in FIG. 17, the IFFT unit 13 may be replaced by a combination of a FFT unit 15 and a reversing unit 45.

However, simple replacement of the IFFT unit 13 by the FFT unit 15 brings about problems that follow:

Problem No. 1: an output level becomes larger by multiplication of a window length of the FFT unit; and Problem No. 2: a series of time-domain output signals "y" is reversed.

To overcome problem No. 1, an either coefficient or signal may be multiplied by "1/N" ("N" is the window length). For example, a coefficient vector may be multiplied by "1/N" ("N" the window length) in advance.

To smooth out problem No. 2, as illustrated in FIG. 17(*a*), a series of time-domain output signals "y's" may be reversed using the reversing unit 45. Alternatively, as illustrated in FIG. 17(*b*), the reversing unit 45 may be set to reverse, in the frequency domain, calculation result "Y" from the vector-multiplying unit. As a further alternative, as illustrated in FIG. 17(*c*), the reversing unit 45 may be set to reverse data vector "X" in the frequency domain.

The reversing unit 45 is only required to practice addressing, which is, e.g., the handling of memory addresses. Therefore, the reversing unit 45 carries a very small burden of calculation. The deletion of the IFFT unit from the signal-processing apparatus makes it feasible to share the FFT unit, and a less burden is imposed on system resources.

According to the present invention, in single-input, multiple-output and multiple-input, multiple-output signal processing, in light of a buffer-caused delay in Discrete Fourier Transform, an amount of calculation per unit time is reduced by an amount of some 20% for the single-input, multiple-output system, and by an amount of some 40% for the multiple-input, multiple-output system, when compared with the prior art improved method. This feature provides high-speed signal processing.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A signal-processing apparatus comprising:

a first Discrete Fourier Transform unit including a real number input portion and an imaginary number input portion, in which each component in a first time window of a first series of input signals in time domain and each component in a second time window of a second series of input signals in time domain are fed into said first Discrete Fourier Transform unit through said real number input portion and said imaginary number input portion, respectively, said first Discrete Fourier Transform unit being operable to transform the components entered through said real number and imaginary number input portions into a complex number data vector in frequency domain;

a vector-multiplying unit operable to provide a a calculation result; and an Inverse Discrete Fourier Transform unit including a real number output portion and an imaginary number output portion, said Inverse Discrete Fourier Transform unit being operable to inversely transform the calculation result, thereby feeding first and second series of output signals in time domain out of said Inverse Discrete Fourier Transform unit through said real number output portion and said imaginary number output portion, respectively, wherein said vector-multiplying unit comprises a splitter operable to separate the complex number data vector into a first data and a second data, said vector-multiplying unit provides the calculating result for each of: the first data, the second data, a first complex number coefficient vector, and a second complex number coefficient vector, wherein the first complex number coefficient vector includes a coefficient vector obtained by discrete Fourier transforming a first convolution coefficient of real number in time domain and a second convolution coefficient of imaginary number in time domain, wherein the second complex number coefficient vector includes a coefficient vector obtained by discrete Fourier transforming a third convolution coefficient of real number in time domain and a fourth convolution coefficient of imaginary number in time domain.

2. A signal-processing apparatus as defined in claim 1, wherein the first data includes a first component being related to the first series of input signals, and the second data includes a second component being related to the second series of input signals, wherein said vector-multiplying unit further comprises a first complex-multiplying unit, a second complex-multiplying unit, and an adder, wherein said first complex-multiplying unit outputs a first multiplication result obtained by multiplying the first complex number coefficient vector by the first data, said second complex-multiplying unit outputs a second multiplication result obtained by multiplying the second complex number coefficient vector by the second data, and said adder outputs the calculation result obtained by adding the first multiplication result to the second multiplication result.

3. A signal-processing unit as defined in claim 1, wherein the first data includes the complex number data vector, and the second data includes a complex conjugate of the complex number data vector, wherein said vector-multiplying unit further comprises a first complex-multiplying unit, a second complex-multiplying unit, and an adder, wherein said first complex-multiplying unit outputs a first multiplication result obtained by multiplying a third complex number coefficient vector by the first data, the third complex number coefficient vector is obtained by subtracting a value that the second complex number coefficient vector multiplies by a complex number from the first complex number coefficient vector, wherein said second complex-multiplying unit outputs a second multiplication result obtained by multiplying a fourth complex number coefficient vector by the second data, the fourth complex number coefficient is obtained by adding a value that the second complex number coefficient vector multiplies by a complex number to the first complex number coefficient vector, wherein said adder outputs the calculation result obtained by adding the multiplication result to the second multiplication result.

4. A signal-processing unit as defined in claim 1, wherein a frequency domain-designed, cross-multiplying unit is provided between an output portion of said first Discrete Fourier Transform unit and an input portion of said Inverse Discrete Fourier Transform unit.

5. A signal-processing apparatus as defined in claim 4, wherein said frequency domain-designed, cross-multiplying unit comprises:

a splitter operable to separate entered data vector into first and second components;

wherein said frequency domain-designed, cross-multiplying unit cross-multiplies the first and second components separated by said splitter, thereby providing a cross-multiplication result.

6. A signal-processing apparatus as defined in claim 4, wherein said frequency domain-designed, cross-multiplying unit is operable to multiply an entered first data vector and a second data vector by predetermined coefficients for each element to add multiplication results therefrom together, thereby providing an addition result, the second data vector being a complex conjugate vector $X^*(N-k)$ of a reversed vector $X(N-k)$ of the first data vector $X(k)$.

7. A signal-processing apparatus as defined in claim 4, wherein said frequency domain-designed, cross-multiplying unit is operable to multiply a first data vector, a second data vector, and an entered third data vector by predetermined coefficients for each element to add multiplication results therefrom together, thereby providing an addition result, the first data vector being a result from past calculation made by said frequency domain-designed, cross-multiplying unit, and the second data vector being a complex conjugate vector $X^*(N-k)$ of a reversed vector $X(N-k)$ of the first data vector $X(k)$.

8. A signal-processing apparatus as defined in claim 1, wherein said Inverse Discrete Fourier Transform unit includes a Discrete Fourier Transform unit and a reversing unit.

* * * * *